United States Patent
Hasegawa et al.

(10) Patent No.: US 9,552,900 B2
(45) Date of Patent: Jan. 24, 2017

(54) COMPOSITE CONDUCTIVE MATERIAL, POWER STORAGE DEVICE, CONDUCTIVE DISPERSION, CONDUCTIVE DEVICE, CONDUCTIVE COMPOSITE AND THERMALLY CONDUCTIVE COMPOSITE

(71) Applicant: GRAPHENE PLATFORM CORPORATION, Tokyo (JP)

(72) Inventors: Shoji Hasegawa, Tokyo (JP); Nagisa Kamiya, Tokyo (JP)

(73) Assignee: GRAPHENE PLATFORM CORPORATION (JP)

( * ) Notice: Subject to any disclaimer, the term of this patent is extended or adjusted under 35 U.S.C. 154(b) by 0 days.

(21) Appl. No.: 14/968,882

(22) Filed: Dec. 14, 2015

(65) Prior Publication Data

US 2016/0180981 A1    Jun. 23, 2016

Related U.S. Application Data

(63) Continuation of application No. 14/764,525, filed as application No. PCT/JP2015/057593 on Mar. 13, 2015.

(30) Foreign Application Priority Data

Sep. 9, 2014  (JP) ............... PCT/JP2014/073838
Feb. 27, 2015  (JP) ............... PCT/JP2015/055977

(51) Int. Cl.
  *H01B 1/04*   (2006.01)
  *C01B 31/02*  (2006.01)
  (Continued)

(52) U.S. Cl.
  CPC ............ *H01B 1/04* (2013.01); *C01B 31/0469* (2013.01); *H01B 1/24* (2013.01)

(58) Field of Classification Search
  CPC ............ C01B 31/02–31/04; H01B 1/02–1/04; H01B 1/24; B82Y 30/00
  (Continued)

(56) References Cited

U.S. PATENT DOCUMENTS 7,071,258 B1   7/2006  Jang et al. ................... 524/496
9,099,742 B2   8/2015  Nishimura et al. ... H01M 4/583
(Continued)

FOREIGN PATENT DOCUMENTS

CN  103834235    6/2014  ............ C09D 11/52
JP  2000348727   12/2000  ............ C01B 31/02
(Continued)

OTHER PUBLICATIONS

Korean Office Action (w/translation of relevant portions) issued in application No. 10-2015-7022376, dated Oct. 12, 2015 (4 pgs).
(Continued)

*Primary Examiner* — Tri V Nguyen
(74) *Attorney, Agent, or Firm* — Hayes Soloway P.C.

(57) ABSTRACT

A composite conductive material includes at least graphene-like exfoliated from a graphite-based graphite carbon material and a conductive material dispersed in a base material. The graphite-based carbon material has a rhombohedral graphite layer (3R) and a hexagonal graphite layer (2H), wherein a Rate (3R) of the rhombohedral graphite layer (3R) and the hexagonal graphite layer (2H), based on an X-ray diffraction method, which is defined by following Equation 1 is 31% or more:

Rate(3R)=P3/(P3+P4)×100    (Equation 1)

wherein
  P3 is a peak intensity of a (101) plane of the rhombohedral graphite layer (3R) based on the X-ray diffraction method, and
  P4 is a peak intensity of a (101) plane of the hexagonal graphite layer (2H) based on the X-ray diffraction method.

5 Claims, 28 Drawing Sheets

(51) Int. Cl.
*C01B 31/04* (2006.01)
*B82Y 40/00* (2011.01)
*H01B 1/24* (2006.01)

(58) Field of Classification Search
USPC ... 252/500–519.1; 423/445 R–448; 977/900, 977/932
See application file for complete search history.

(56) References Cited

U.S. PATENT DOCUMENTS

| | | | |
|---|---|---|---|
| 9,428,393 B2 | 8/2016 | Hasegawa et al. | C01B 31/04 |
| 9,440,856 B2 | 9/2016 | Coleman | 31/446 |
| 2006/0035081 A1* | 2/2006 | Morita | B82Y 30/00 428/408 |
| 2010/0147188 A1 | 6/2010 | Mamak et al. | 106/31.13 |
| 2011/0200888 A1 | 8/2011 | Ozaki et al. | 429/338 |
| 2012/0070733 A1* | 3/2012 | Yamada | H01M 4/587 429/211 |
| 2012/0315550 A1 | 12/2012 | Liu et al. | 429/338 |
| 2013/0102084 A1 | 4/2013 | Loh et al. | 436/94 |
| 2013/0270119 A1 | 10/2013 | Wada et al. | 205/50 |
| 2015/0073082 A1 | 3/2015 | Mukohata et al. | 524/427 |
| 2015/0118566 A1* | 4/2015 | Toda | C01B 31/04 429/231.4 |

FOREIGN PATENT DOCUMENTS

| | | | |
|---|---|---|---|
| JP | 2000348727 A * | 12/2000 | C01B 31/02 |
| JP | 2011034909 | 2/2011 | C01B 3/104 |
| JP | 2011513167 | 4/2011 | C01B 31/04 |
| JP | 2013077475 | 4/2013 | H01M 4/62 |
| JP | 2013513904 | 4/2013 | C01B 25/45 |
| JP | 2013536141 | 9/2013 | C01B 31/02 |
| JP | 2014067637 | 4/2014 | H01M 4/133 |
| WO | WO2009106507 | 9/2009 | C01B 31/04 |
| WO | WO2011162727 | 12/2011 | C01B 31/04 |
| WO | WO2013/146213 | 3/2013 | C08L 101/00 |
| WO | WO 2013/100081 | 4/2013 | H01M 10/069 |
| WO | WO2013146144 A1 * | 10/2013 | H01M 4/587 |
| WO | WO2014064432 | 5/2014 | C09D 11/02 |
| WO | WO2014087992 | 6/2014 | C01B 31/02 |
| WO | WO2014115669 | 7/2014 | H01M 4/36 |

OTHER PUBLICATIONS

Anonymous, "Single-walled carbon nanotube/carbon fiber/rubber composite material having a thermal conductivity of titanium par," National Institute of Advanced Industrial Science and Technology (AIST) Press Release, 2011 (http://www.aist.go.jp/aist_j/press_release/pr2011/pr02111006/pr20111006.html) (7 pgs).
Inagaki et al., "Structural Change of Graphite with Grinding," Feb. 1, 1973, No. 74, pp. 76-82 (7 pgs).
Japanese Decision to a Grant Patent issued in application 2015-516139, dated Jun. 22, 2015 (6 pgs).
Japanese Office Action issued in application No. 2015-516139, dated May 12, 2015 (4 pgs).
Kawasaki, S. Classification of solid carbon materials and their structural characteristics, Nagoya Institute of Technology, undated, (49 pgs).
Noda et al., "Changes of Probabilities $P_1$, $P_{ABA}$, $P_{ABC}$ with Heat Treatment of Carbons," Sep. 16, 1966, No. 47, pp. 14-23 (10 pgs).
Parthasarathy et al., "Spectroscopic and X-ray diffraction studies on fluid deposited rhombohedral graphite from the Eastern Ghats Mobile Belt, India," Current Science, vol. 90, No. 7, Apr. 10, 2006, pp. 995-1000 (6 pgs).
Yamaki et al., "Synthesize of $LiCoO_2$ by Excess Li Method and Application for Li Secondary Cells," The Mieromeritics (52), 2009, Hosokawa Powder Technology Research Institute, pp. 13-18 (6 pgs).
Notice of Acceptance issued in related Australian Patent Application Serial No. 2015242994, dated Jan. 18, 2016 (2 pages).
Canadian Official Action issued in related Canadian Patent Application Serial No. 2,916,783, dated Feb. 24, 2016 (4 pages).
Great Britain Official Action issued in related Great Britain Patent Application Serial No. GB1601710.5, dated Apr. 11, 2016 (7 pages).
Great Britain Official Action issued in related Great Britain Patent Application Serial No. GB1601712.1, dated Apr. 11, 2016 (7 pages).
Great Britain Official Action issued in related Great Britain Patent Application Serial No. GB1601711.3, dated Apr. 11, 2016 (7 pages).
Great Britain Official Action issued in related Great Britain Patent Application Serial No. GB1513666.6, dated Dec. 10 2015 (3 pages).
Great Britain Official Action issued in related Great Britain Patent Application Serial No. GB1513666.6, dated Apr. 11, 2016 (3 pages).
Singapore Official Action issued in related Singapore Patent Application Serial No. 11201600970W, dated Aug. 16, 2016 (3 pages).
Canadian Official Action issued in related Canadian Patent Application Serial No. 2,916,783, dated Jun. 10, 2016 (3 pages).
European Official Action issued in related European Patent Application Serial No. 15741473.1, dated Mar. 9, 2016 (12 pages).
Korean Official Action issued in related Korean Patent Application Serial No. 10-2015-7022376, dated Oct. 12, 2015 (5 pages) with English Translation.
Israeli Official Action issued in related Israeli Patent Application Serial No. 34682/16, dated Jun. 30, 2016 (4 pages) with English translation.
Taiwan Official Action issued in related Taiwan Patent Application Serial No. 104127382, dated Mar. 10, 2016 (3 pages).

* cited by examiner

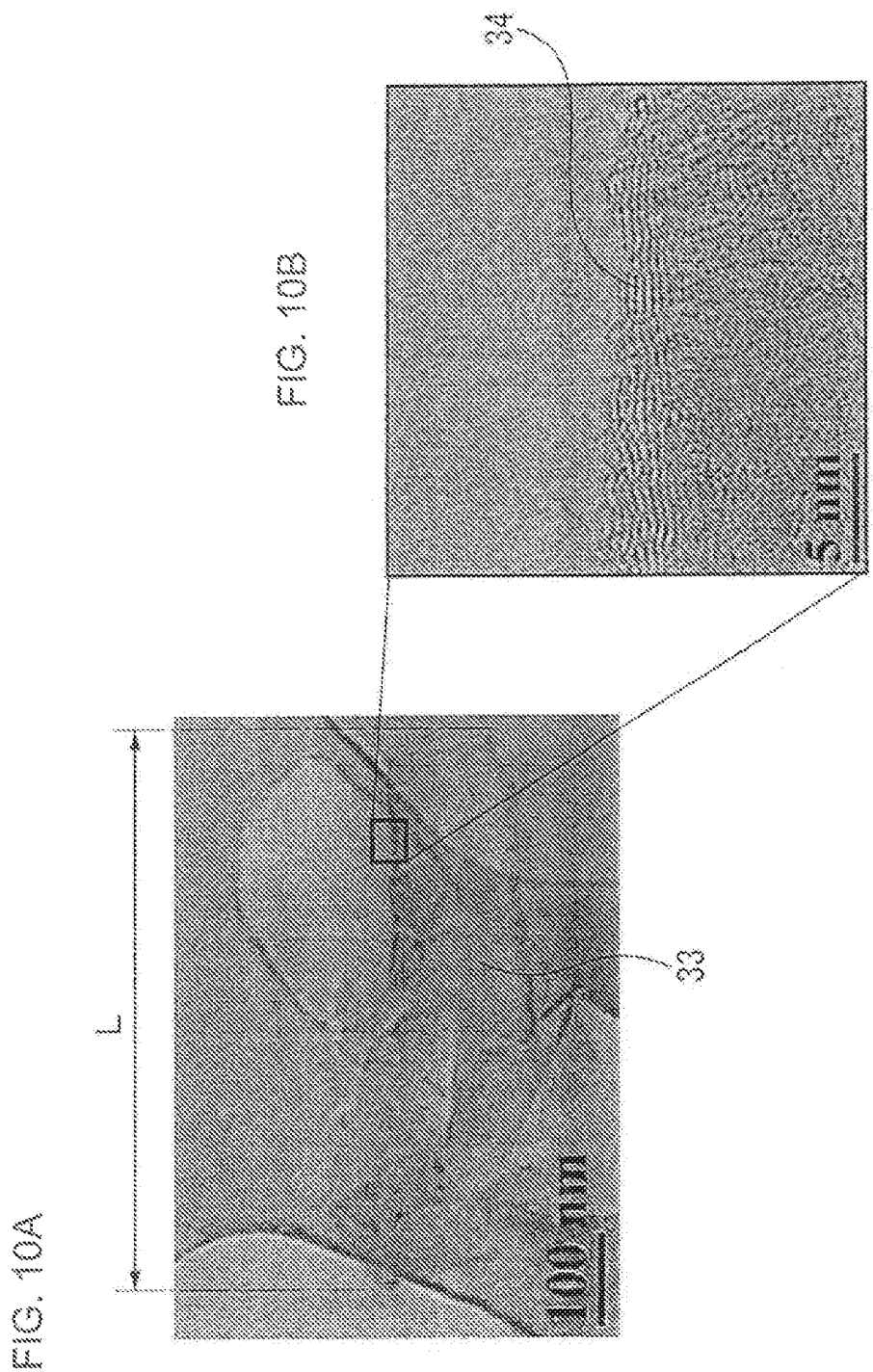

FIG. 13

| Sample No. | 1 | 2 | 3 |
|---|---|---|---|
| Distribution of Number of Layers | | | |
| P3/(P3+P4) | 23% | 31% | 38% |
| 10 layers or less | 10% | 25% | 38% |
| P1/P2 | 0.008 | 0.016 | 0.016 |
| P1 | 120 | 342 | 128 |
| P2 | 15000 | 20993 | 8253 |
| P3 | 50 | 321 | 173 |
| P4 | 160 | 693 | 282 |

| Sample No. | 4 | 5 | 6 | 7 |
|---|---|---|---|---|
| Distribution of Number of Layers | | | | |
| P3/(P3+P4) | 42% | 46% | 51% | 58% |
| 10 layers or less | 62% | 68% | 76% | 82% |
| P1/P2 | 0.014 | 0.012 | 0.014 | 0.012 |
| P1 | 253 | 162 | 66 | 151 |
| P2 | 18226 | 13157 | 4675 | 12850 |
| P3 | 320 | 396 | 170 | 452 |
| P4 | 435 | 466 | 162 | 325 |

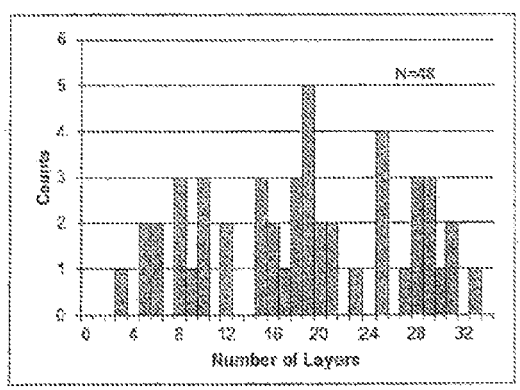 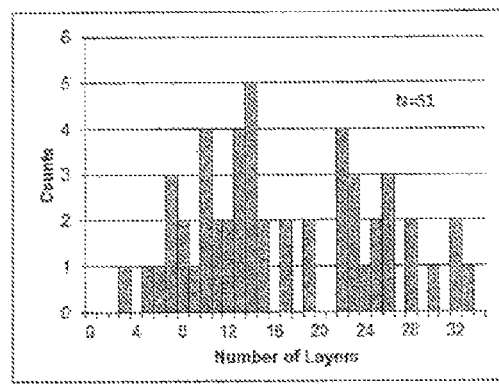
FIG. 19A
FIG. 19B
P3/(P3+P4)=28%
10 layers or less: 25%
P3/(P3+P4)=31%
10 layers or less: 25%

COMPOSITE CONDUCTIVE MATERIAL, POWER STORAGE DEVICE, CONDUCTIVE DISPERSION, CONDUCTIVE DEVICE, CONDUCTIVE COMPOSITE AND THERMALLY CONDUCTIVE COMPOSITE

CROSS REFERENCE TO RELATED APPLICATION

This application is a continuation of co-pending U.S. patent application Ser. No. 14/764,525, filed Jul. 29, 2015, 2015, which is entirely incorporated herein by reference.

TECHNICAL FIELD

The present invention relates to a composite conductive material, a power storage device, a conductive dispersion, a conductive device, a conductive composite, thermally conductive composite and method of producing a composite conductive material.

BACKGROUND ART

In recent years, addition of various nanomaterials has been studied for purposes of downsizing and weight saving in various fields. In particular, for problems of environments or resources, carbon materials such as graphene, CNT and fullerene have attracted attention as nonmetal nanomaterials. For example, a lithium-ion battery currently put to practical use has been improved in its capacity owing to an improvement of the active material itself. However, the capacity is significantly lower than its theoretical capacity, and further improvement has been desired.

Regarding this matter, while acetylene black has been conventionally used as a conductive assistant for lithium-ion batteries, novel high conductive materials such as a carbon nanofiber (VGCF (vapor grown carbon fiber): registered trademark) manufactured by Showa Denko K. K. have been studied in recent years to further improve electrical conductivity (Patent Literature 1: JP-A-2013-77475).

Further, a method of improving cycle characteristics (repetition performance) of a battery by directly coating a positive electrode active material with an electrical conductor and a method of producing a high-capacity and high-output lithium-ion battery by focusing attention on ion conductivity have been studied. (Patent Literature 2: JP-T-2013-513904), (Patent Literature 3: WO 2014/115669)

Furthermore, nanosizing of an active material itself for a lithium-ion battery has been also studied in recent years. (Non-Patent Literature 5)

CITATION LIST

Patent Literature

PTL 1: JP-A-2013-77475 (Paragraphs 0031-0039)
PTL 2: JP-T-2013-513904 (Paragraph 0016)
PTL 3: WO 2014/115669 (Paragraphs 0017, 0018)
PTL 4: WO 2014/064432 (lines 4-9 on page 19)

Non Patent Literature

NPL 1: Structural Change of Graphite with Griding; authors: Michio INAGAKI, Hisae MUGISHIMA, and Kenji HOSOKAWA; Feb. 1, 1973 (Received)

NPL 2: Changes of Probabilities P1, PABA, PABC with Heat Treatment of Carbons; authors: Tokiti NODA, Masaaki IWATSUKI, and Michio INAGAKI; Sep. 16, 1966 (Received)

NPL 3: Spectroscopic and X-ray diffraction studies on fluid deposited rhombohedral graphite from the Eastern Ghats Mobile Belt, India; G. Parthasarathy, Current Science, Vol. 90, No. 7, 10 Apr. 2006

NPL 4: Classification of solid carbon materials and their structural characteristics; Nagoya Institute of Technology; Shinji KAWASAKI NPL 5: Synthesis of LiCoO2 nanoparticles. The Micromeritics (52), 13-18, 2009. Hosokawa Powder Technology Research Institute. (ISSN: 04299051)

NPL 6: The National Institute of Advanced Industrial Science and Technology. Single-wall carbon nanotube/carbon fiber/rubber composite material having thermal conductivity equal to that of titanium (http://www.aist.go.jp/aist_j/press_release/pr2011/pr20111006/pr20111006.html)

SUMMARY OF INVENTION

Technical Problem

However, a fundamental solution to the capacity is not obtained by such methods as disclosed in Patent Literatures 2 and 3, and Non-Patent Literature 5, and the problem, it seems, lies somewhere else. In order to conduct electricity and the like between substances, they simply need to be bridged by an electrical conductive material, however, there is usually resistance in a contact part between a conductor and an electrical conductive material. Further, a contact area is small between curved surfaces and there are many point contacts, which contribute to an increased contact resistance. It is essentially considered that resistance becomes higher as the number of contact points increases.

If this is applied to a lithium-ion battery, a positive electrode active material and a conductive assistant (an electrical conductor) such as acetylene black and VGCF are in a spherical or string-like shape, i.e., a curved shape, having a size of a nano- to micrometer range, thus many conductive assistants are interposed between positive electrode active materials, thereby creating many contact points. Hence, it is considered that the theoretical capacity is not achieved because of the contact resistance.

As described above, the theoretical capacity has never been achieved in any of Patent Literatures 1 to 3, or Non-Patent Literature 5.

On the other hand, as for thermal conductivity, it has been proposed that a high thermal conduction sheet can be obtained by combining carbon fibers and CNT, used in a small addition amount (Non-Patent Literature 6). However, in this method, in the same manner as described above, a substance in a string-like shape makes a point contact with each other, therefore heat transfer resistance is generated in a similar manner as in electric conductivity. As a result, the effect is not as high as expected.

Regarding this matter, while paying attention to lowering contact resistance and maximally exploiting the performance of a conductor, studies have been conducted on the use of graphene, which is a conductor, a planar substance, and a flexible carbon material.

There has been a problem that an amount of the graphene that is exfoliated is normally small by processing natural graphite without any treatments. However, as a result of earnest studies, by carrying out predetermined treatments to graphite serving as a source material, there is obtained a graphite-based carbon material (a graphene precursor), from which graphene is easily exfoliated, the graphene being able to be dispersed at a high concentration or to a high degree.

A part or whole of the graphene precursor is exfoliated by ultrasonic waves, stirring and kneading to produce a mixed material being "graphene-like graphite", containing material from the graphene precursors to the graphene. A size, thickness, etc. of the graphene-like graphite is not limited since they are variable depending on an addition amount, a process time, etc. of the graphene precursors, however, the graphene-like graphite is preferably more flaked.

That is, in other words, the graphite-based carbon material (the graphene precursor) is a type of graphite capable of being easily exfoliated and dispersed as graphene-like graphite by existing stirring and kneading processes or devices.

Since the graphene-like graphite is excellent in conductivity, it is found that, when it is used in a high dispersion state, for example, in a positive electrode of a lithium-ion secondary battery, a capacity thereof can be made close to its theoretical capacity.

The invention has been completed focusing on such problems, and an object of the invention is to provide a composite conductive material, a power storage device, a conductive dispersion, a conductive device, a conductive composite, thermally conductive composite, and a method of producing a composite conductive material which are excellent in conductivity.

Solution to Problem

In order to solve the aforementioned problems, the composite conductive material of the present invention comprises at least graphene-like graphite exfoliated from a graphite-based carbon material and a conductive material dispersed in a base material, the graphite-based carbon material characterized by having a rhombohedral graphite layer (3R) and a hexagonal graphite layer (2H), wherein a Rate (3R) of the rhombohedral graphite layer (3R) and the hexagonal graphite layer (2H), based on an X-ray diffraction method, which is defined by following Equation 1 is 31% or more:

$$\text{Rate}(3R) = P3/(P3+P4) \times 100 \qquad \text{Equation 1}$$

wherein

P3 is a peak intensity of a (101) plane of the rhombohedral graphite layer (3R) based on the X-ray diffraction method, and P4 is a peak intensity of a (101) plane of the hexagonal graphite layer (2H) based on the X-ray diffraction method.

According to the features, the composite material is excellent in conductivity. This is because, it is speculated that, the graphene-like graphite exfoliated from the graphite-based carbon material exists in a flake state, thus the graphene-like graphite makes a contact with the base material and the conductive material in many regions. It is also speculated that this is because the graphene-like graphite is thin and easily deformable, thus the contact is made as a plane contact.

The conductive material is characterized by being a microparticle in a string-like, straight chain-like, linear, or flake-like shape.

According to the feature, the microparticle is surrounded by the graphene-like graphite, thus conductivity of the microparticle can be sufficiently exerted.

The microparticle is characterized by having an aspect ratio of 5 or more.

According to the feature, conductivity of the microparticle can be further sufficiently exerted.

A weight ratio of the graphite-based carbon material to the conductive material is characterized by being 1/50 or more and less than 10.

According to the feature, conductivity of the microparticle can be efficiently exerted.

The base material is characterized by being an active material for a battery.

According to the feature, an electrode excellent in charging and discharging characteristics can be obtained.

The active material is characterized by being an active material for a positive electrode.

According to the feature, a positive electrode excellent in charging and discharging characteristics can be obtained.

The base material is characterized by being a polymer.

According to the feature, a composite conductive material excellent in electric, thermal, and ion conductivity can be obtained.

The base material is characterized by being a material that is annihilated by vaporization and the like.

According to the feature, the graphene-like graphite can be uniformly dispersed in the conductive materials by dispersing the graphene-like graphite using the base materials and then by annihilating the base materials.

A power storage device, such as a primary battery, a secondary battery, and a capacitor, is characterized by comprising the composite conductive material.

According to the feature, a power storage device excellent in power storage performance can be obtained.

A conductive dispersion, such as a conductive ink, a conductive paste, and a conductive slurry, is characterized by comprising the composite conductive material.

According to the feature, a conductive dispersion excellent in conductivity can be obtained.

A conductive device, such as a transparent electrode, a transparent conductive film, a conductive circuit, and a substrate, is characterized by being coated or printed using the conductive dispersion.

According to the feature, a conductive device excellent in conductivity can be obtained.

A conductive composite for use in preventing electrification and static electricity, intercepting electromagnetic waves, and the like is characterized by comprising the composite conductive material.

According to the feature, a conductive composite excellent in conductivity can be obtained.

A thermally conductive composite, such as a heat sink and a heat radiation grease, is characterized by comprising the composite conductive material.

According to the feature, a thermally conductive composite excellent in heat transfer characteristics can be obtained.

BRIEF DESCRIPTION OF DRAWINGS

FIGS. 10(*a*) and (*b*) are TEM images of a graphite-based carbon material (graphene) dispersed in a dispersion.

FIG. 13 is a diagram which shows distributions of the number of layers of graphite-based carbon materials each dispersed in dispersions that were produced using Samples 1 to 7 as precursors.

FIG. 19 is a figure which shows a distribution state of a graphite-based carbon material in a dispersion, dispersed in N-methylpyrrolidone (NMP), for providing a supplementary description of a dispersing state of Example 5, where (*a*) is a distribution state of sample 12, and (*b*) is a distribution state of sample 2.

DESCRIPTION OF EMBODIMENTS

Figure 1A:
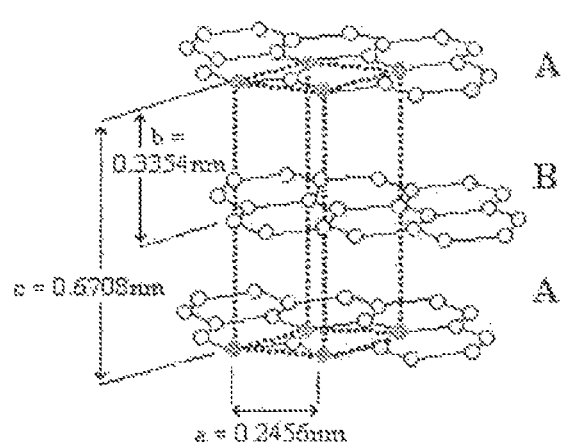
FIG. 1 is a figure which shows a crystal structure of graphite, where (a) refers to a crystal structure of hexagonal crystals, and (b) refers to a crystal structure of rhombohedral crystals.
Figure 1B:
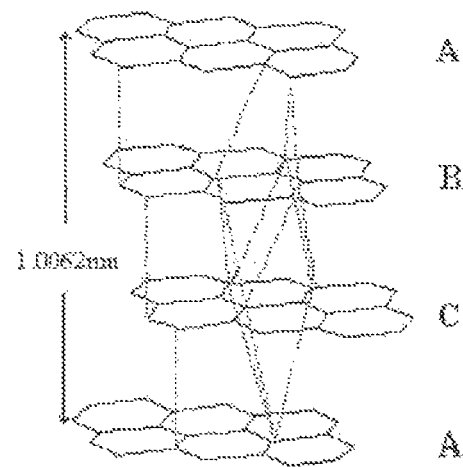

The invention focuses on a crystal structure of graphite, and, at first, matters relating to the crystal structure will be explained. It has been known that natural graphite is classified into three types of crystal structures, namely hexagonal crystals, rhombohedral crystals and disordered crystals, depending on an overlapping manner of layers. As shown in FIG. 1, hexagonal crystals have a crystal structure in which layers are arranged in the order of ABABAB . . . , while rhombohedral crystals have a crystal structure in which layers are arranged in the order of ABCABCABC . . . .

In natural graphite, there are almost no rhombohedral crystals in a stage where natural graphite is excavated. However, about 14% of rhombohedral crystals exist in general natural graphite-based carbon materials because pulverization or the like is carried out in a purification stage. In addition, it has been known that a proportion of rhombohedral crystals converges on about 30% even when pulverization is carried out during purification for a long time (Non-Patent Literatures 1 and 2).

Moreover, a method in which graphite is expanded by heating, rather than with physical forces such as pulverization, thereby flaking the graphite. However, even when graphite is treated with a heat of 1600 K (about 1,300° C.), a proportion of rhombohedral crystals is about 25% (Non-Patent Literature 3). Furthermore, the proportion is up to about 30% even when heat of an extremely high temperature of 3000° C. is applied thereto (Non-Patent Literature 2).

Thus, although it is possible to increase a proportion of rhombohedral crystals by treating natural graphite with physical forces or heat, the upper limit is about 30%.

Hexagonal crystals (2H), which are included in natural graphite at a high level, are very stable, and an interlayer van der Waals' force between their graphene layers is shown by Equation 3 (Patent Literature 4). By applying an energy exceeding this force, graphene is exfoliated. An energy required for the exfoliation is inversely proportional to the cube of the thickness. Therefore, in a thick state where numerous layers are overlapped, graphene is exfoliated by a weak physical force such as by very feeble ultrasonic waves. However, in a case where graphene is exfoliated from somewhat thin graphite, a very large energy is required. In other words, even if graphite is treated for a long time, only weak parts of the surface are exfoliated, and large parts remain not exfoliated.

$$Fvdw = H \cdot A / (6\pi \cdot t^3)$$ Equation 3

Fvdw: Van der Waals' force
H: Hamaker constant
A: Surface area of graphite or graphene
t: Thickness of graphite or graphene The present inventors succeeded in increasing a proportion of rhombohedral crystals (3R), which had been increased to only about 30% by treatments of pulverization or heating to an extremely high temperature, to 30% or more by carrying out predetermined treatments, as shown below, to natural graphite. The following findings were obtained as results of experiments and studies. That is, when a content of rhombohedral crystals (3R) in a graphite-based carbon material is higher, particularly when the content is 31% or more, there is a tendency that graphene is easily exfoliated by use of such a graphite-based carbon material as a precursor, thereby easily obtaining a highly concentrated and dispersed graphene dispersion or the like. For the reason, it is considered that, when a shear force or the like is applied to rhombohedral crystals (3R), a deformation occurs between layers, i.e. a deformation in the entire structure of the graphite becomes large, and graphene is easily exfoliated independently of the van der Waals' force. Accordingly, in the invention, a graphite-based carbon material, from which graphene is easily exfoliated by carrying out predetermined treatments to natural graphite, and which makes it possible to disperse graphene at a high concentration or to a high degree, is called a graphene precursor. Hereinafter, a method of producing a graphene precursor showing predetermined treatments, a crystal structure of the graphene precursor, and a graphene dispersion using the graphene precursor will be described in that order in examples below.

Here, in the specification, a graphene refers to a flake-like or sheet-like graphene which is a crystal of a mean size of 100 nm or more but which is not a fine crystal of a mean size of several nanometers to tens of nanometers, and which has 10 layers or less.

Additionally, since graphene is a crystal with a mean size of 100 nm or more, when artificial graphite and carbon black, which are amorphous (microcrystal) carbon materials other than natural graphite, are even treated, graphene cannot be obtained (Non-Patent Literature 4).

Further, in the specification, a graphene composite means a composite which is produced by using the graphite-based carbon material useful as a graphene precursor according to the invention, i.e. a graphite-based carbon material having a Rate (3R) of 31% or more (e.g. Samples 2-7 of Example 1, samples 2, 21, . . . of Example 5 described below).

Hereinafter, examples for carrying out the composite conductive material, the power storage device, the conductive dispersion, the conductive device, the conductive composite, and the thermally conductive composite, according to the present invention, will be described.

EXAMPLE 1

<As to Production of a Graphite-Based Carbon Material Useful as a Graphene Precursor>

A method for obtaining a graphite-based carbon material useful as a graphene precursor by a production apparatus A using a jet mill and plasma shown in FIG. 3 will be explained. As an example, the production apparatus A refers to a case in which plasma is applied for the radiowave-force-based treatment and in which the jet mill is used for the physical-force-based treatment.

Figure 3:
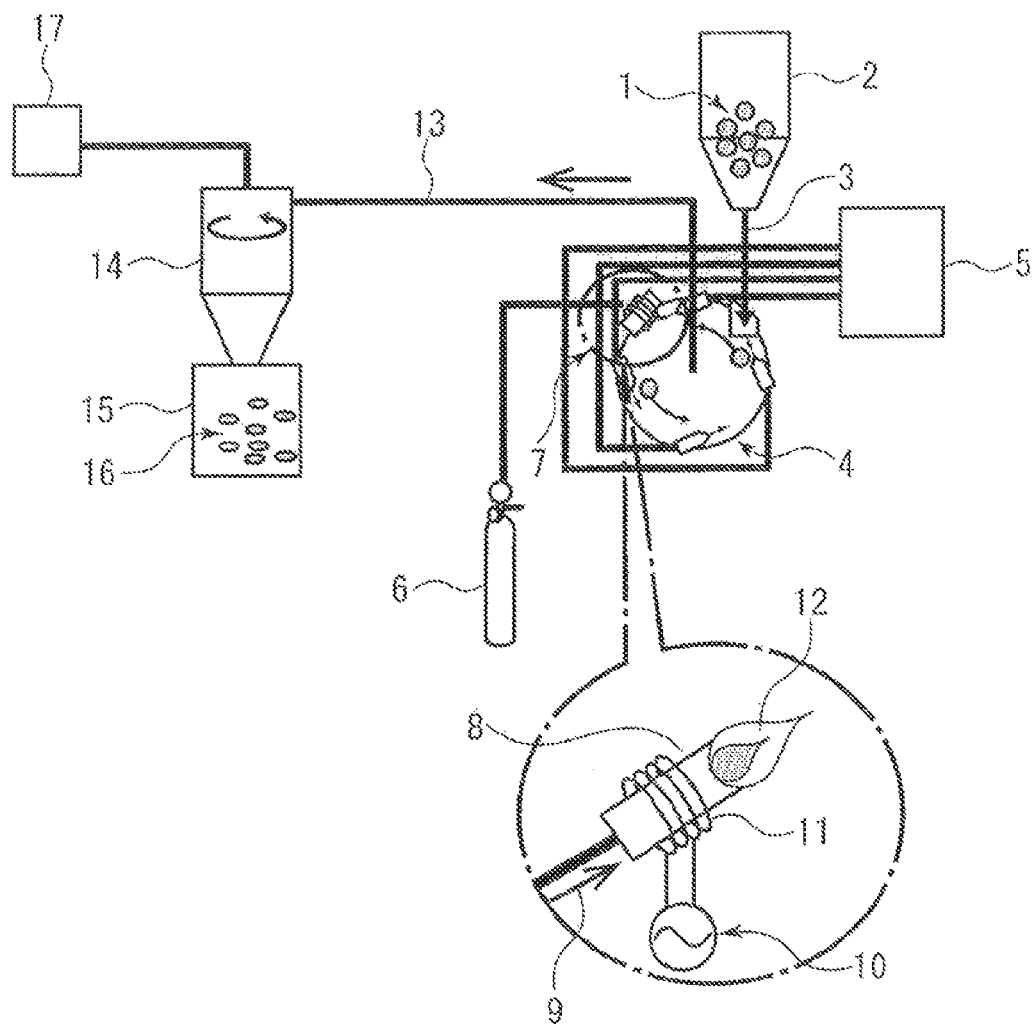
FIG. 3 is a diagram which illustrates a production apparatus A using a jet mill and plasma of Example 1.

In FIG. 3, the symbol 1 refers to a particle of 5 mm or less of a natural graphite material (flaky graphite ACB-50 manufactured by Nippon Graphite Industries, ltd.); the symbol 2 refers to a hopper which stores the natural graphite material 1; the symbol 3 refers to a Venturi nozzle which discharges the natural graphite material 1 from the hopper 2; the symbol 4 refers to a jet mill which jets the air which has been pumped from a compressor 5, while being divided into eight places, to thereby allow the natural graphite material to collide against the inside of a chamber by a jet blast; and the symbol 7 refers to a plasma generator which sprays a gas 9, such as oxygen, argon, nitrogen or hydrogen, through a nozzle 8 from a tank 6 and which applies a voltage to a coil 11, wound around the outer periphery of the nozzle 8, from a high-voltage power supply 10, thereby generating plasma inside the chamber of the jet mill 4, and the plasma generator is provided in each of four places inside the chamber. The symbol. 13 refers to a pipe which connects the jet mill 4 and a dust collector 14 to one another; the symbol 14 refers to a dust collector; the symbol 15 refers to a collection container; the symbol 16 refers to a graphite-based carbon material (graphene precursor); and the symbol 17 refers to a blower.

Next, the production method will be explained. Conditions for the jet mill and plasma are as follows.

The conditions for the jet mill are as follows.
Pressure: 0.5 MPa
Air volume: 2.8 m³/min
Nozzle inner Diameter: 12 mm
Flow rate: about 410 m/s
The conditions for plasma are as follows.
Output: 15 W
Voltage: 8 kV
Gas species: Ar (purity 99.999 vol %)
Gas flow rate: 5 L/min It is considered that the natural graphite materials 1, which have been charged into the chamber of the jet mill 4 from the Venturi nozzle 3, are accelerated to the sonic velocity or higher inside the chamber, and are pulverized by impact between the natural graphite materials 1 or by impact of them against the wall, and that, simultaneously, the plasma 12 discharges an electric current or excites the natural graphite materials 1, acts directly on atoms (electrons), and increases deformations of crystals, thereby promoting the pulverization. When the natural graphite materials 1 turn into fine particles of a certain particle diameter (about 1 to 10 μm), their mass is reduced, the centrifugal force is weakened, and, consequently, the natural graphite materials 1 are pumped out from the pipe 13 which is connected to the center of the chamber.

A gas including graphite-based carbon materials (graphene precursors), which have been flowed from the pipe 13 into a cylindrical container of the chamber of the dust collector 14, forms a spiral flow, and drops the graphite-based carbon materials 16, which collide with the internal wall of the container, to a collection container 15 below, while an ascending air current generates in the center of the chamber due to a tapered container part of the downside of the chamber, and the gas is emitted from the blower 17 (so-called cyclone effects). According to the production apparatus A in this example, about 800 g of a grapheme precursor from 1 kg of the raw materials, i.e. natural graphite materials 1, is used. The graphite-based carbon material (graphene precursors) 16 was obtained (recovery efficiency: about 80%).

Next, based on the production apparatus B using a ball mill and microwaves shown in FIG. 4, a method for obtaining a graphite-based carbon material useful as a graphene precursor will be described. The apparatus B refers to, as an example, a case where microwaves are applied as the radiowave-force-based treatment and where a ball mill is used for the physical-force-based treatment.

Figure 4A:
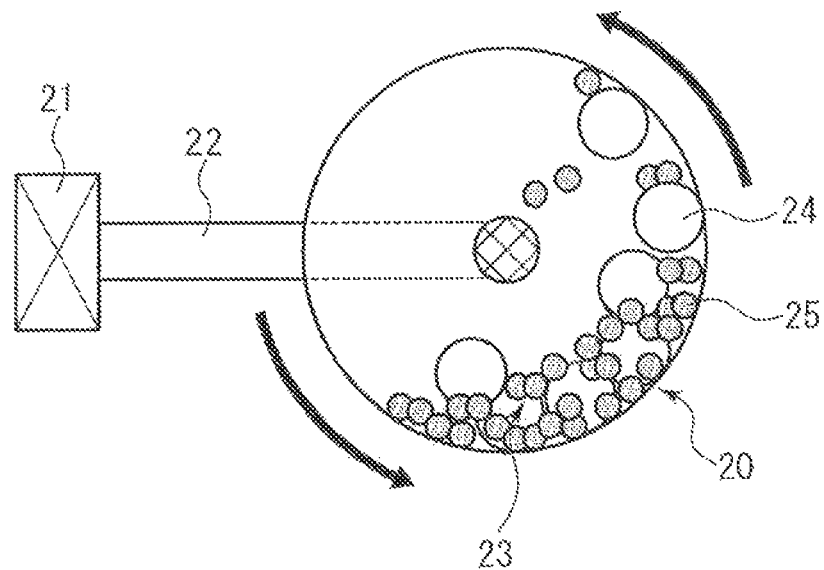
FIG. 4 is a figure which illustrates a production apparatus B using a ball mill and magnetron of Example 1, where (a) is a diagram which illustrates a pulverizing state, and (b) is a diagram which illustrates a state where graphite-based carbon materials (precursors) are collected.
Figure 4B:
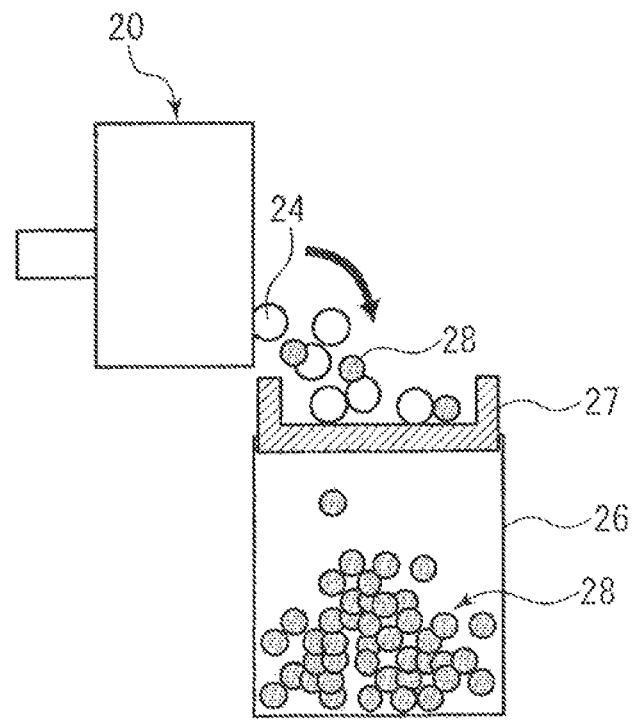

In FIGS. 4 (a) and (b), the symbol 20 refers to the ball mill; the symbol 21 refers to a microwave generator (magnetron); the symbol 22 refers to a wave guide; the symbol 23 refers to a microwave inlet; the symbol 24 refers to a media; the symbol 25 refers to particles of 5 mm or less of a natural graphite material (flaky graphite ACB-50 manufactured by Nippon Graphite Industries, ltd.); the symbol 26 refers to a collection container; the symbol 27 refers to a filter; and the symbol 28 refers to graphite-based carbon material (graphene precursors).

Next, the production method will be explained. Conditions for the ball mill and the microwave generator are as follows.

The conditions for the ball mill are as follows.
Rotational speed: 30 rpm
Media size: $\phi$5 mm
Media species: zirconia balls
Pulverization time: 3 hours The conditions for the microwave generator (magnetron) are as follows.
Output: 300 W
Frequency: 2.45 GHz
Irradiation method: Intermittent 1 kg of natural graphite carbon raw materials 25 and 800 g of media 24 are charged into the chamber of the ball mill 20, the chamber is closed, and the mixture is treated at a rotational speed of 30 rpm for 3 hours. During the treatment, microwaves are irradiated intermittently (for 20 seconds every 10 minutes) to the chamber. It is considered that the microwave irradiation acts directly on atoms (electrons) of the raw materials, thus increasing deformations of the crystals. After the treatment, media 24 are removed by the filter 27, and thus, powder of about 10 μm of graphite-based carbon materials (precursors) 28 can be collected in the collection container 26.

<As to an X-Ray Diffraction Profile of Graphite-Based Carbon Materials (Graphene Precursors)>

Figure 5:
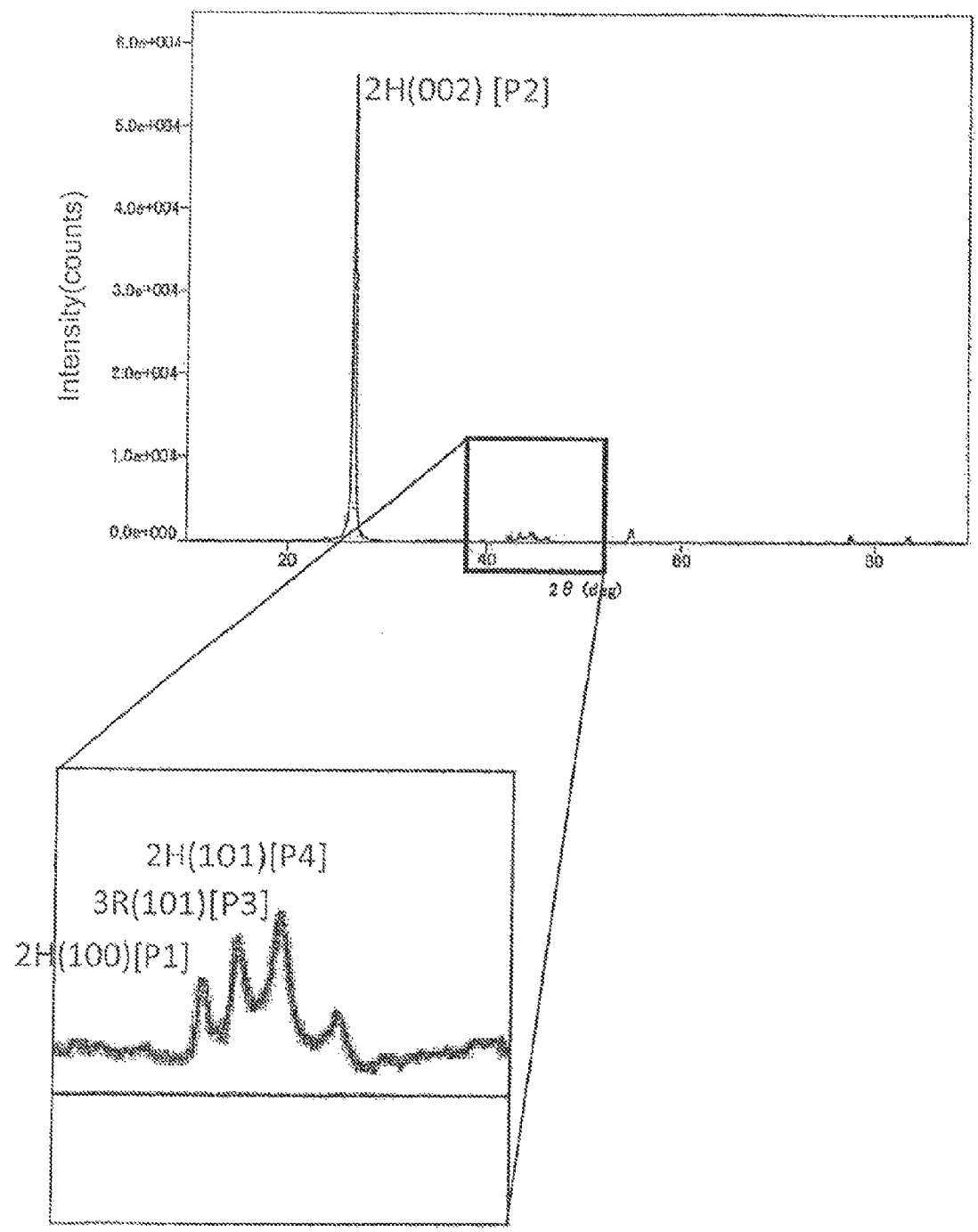
FIG. 5 is a diagram which shows an X-ray diffraction profile of a graphite-based carbon material of Sample 5 produced by the production apparatus B according to Example 1.
Figure 6:
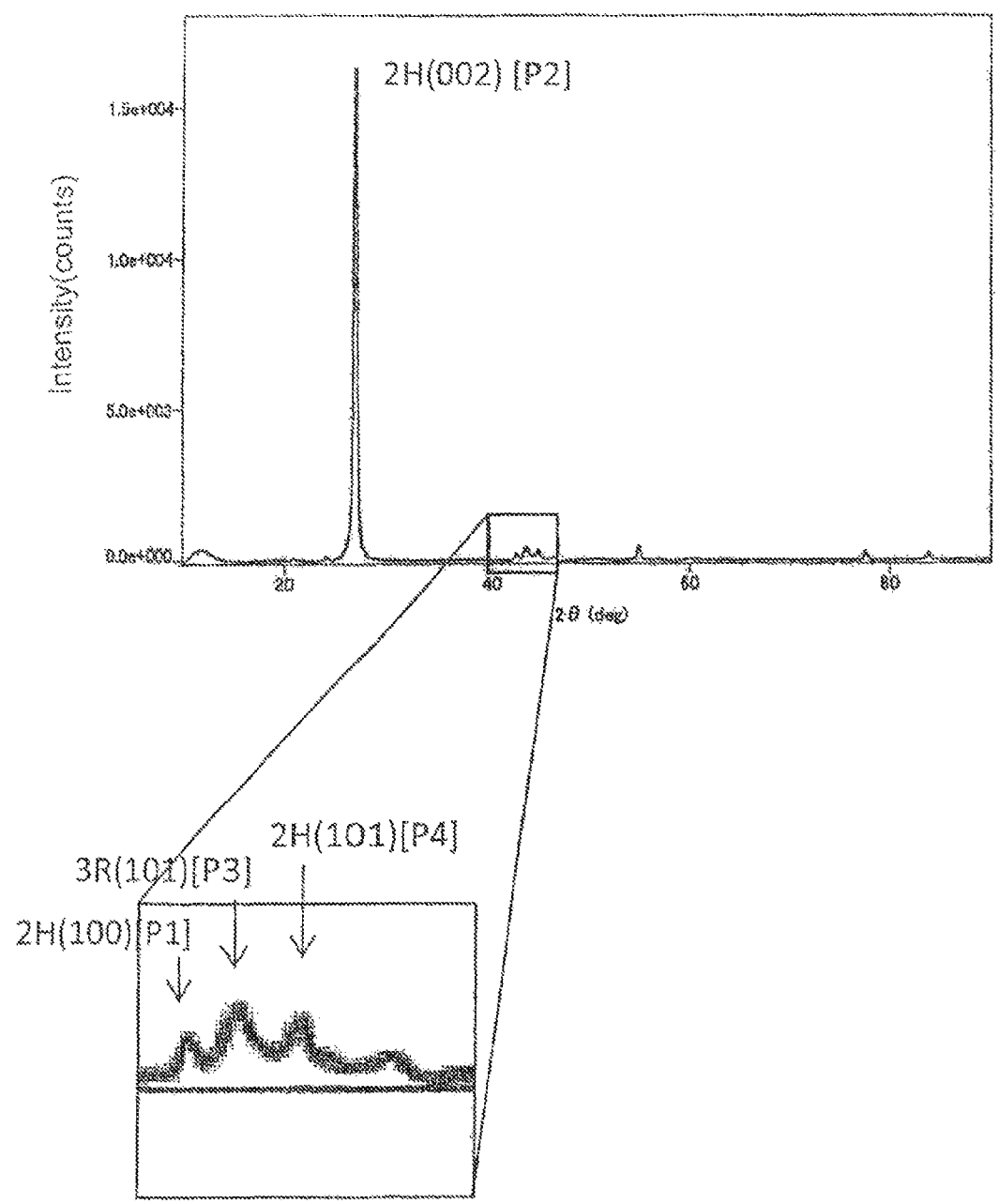
FIG. 6 is a diagram which shows an X-ray diffraction profile of a graphite-based carbon material of Sample 6 produced by the production apparatus A according to Example 1.
Figure 7:
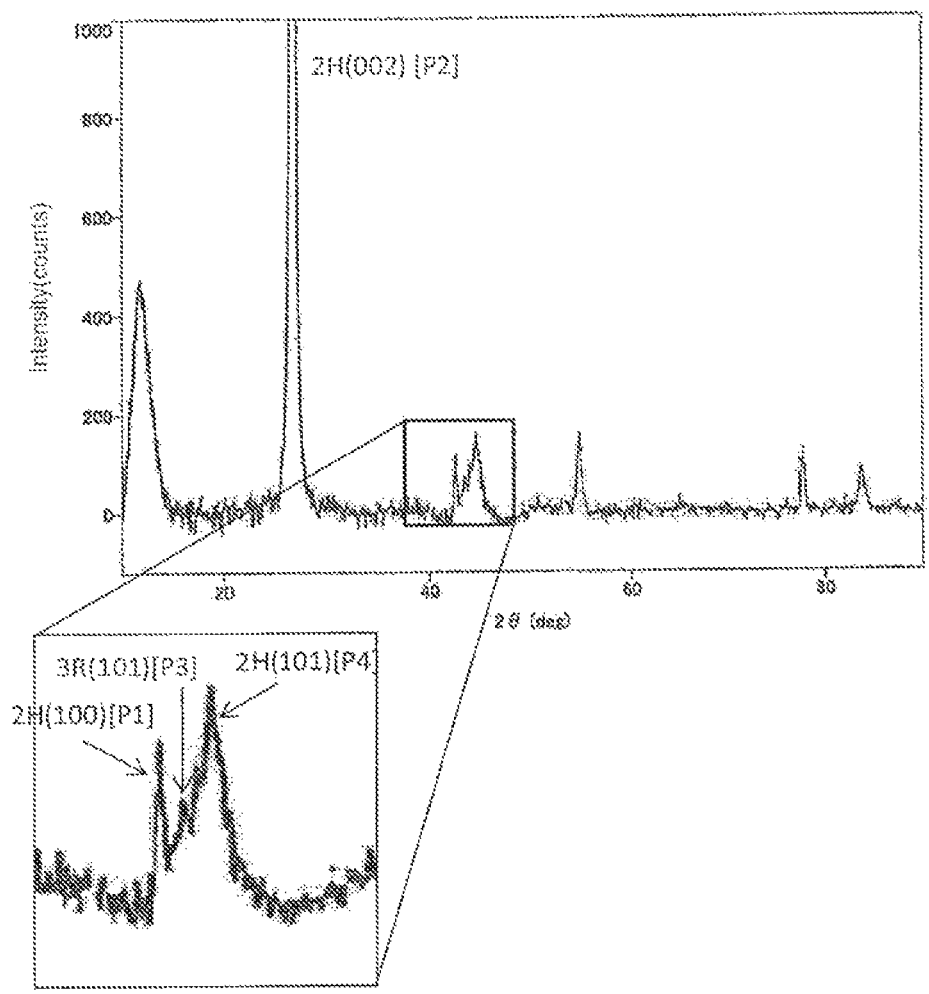
FIG. 7 is a diagram which shows an X-ray diffraction profile of a graphite-based carbon material of Sample 1 indicating a comparative example.

With reference to FIGS. 5 to 7, X-ray diffraction profiles and crystal structures will be described with respect to graphite-based natural materials (Samples 6 and 5) produced by the production apparatuses A and B, and the powder of about 10 μm of graphite-based natural materials (Sample 1: a comparative example) obtained by using only the ball mill of the product ion apparatus B.

The measurement conditions for the X-ray diffraction apparatus are as follows.
Source: Cu Kα ray
Scanning speed: 20°/min
Tube voltage: 40 kV
Tube current: 30 mA According to the X-ray diffraction method (horizontal-sample-mounting-model multi-purpose X-ray diffractometer Ultima IV manufactured by Rigaku Corporation), each sample shows peak intensities P1, P2, P3 and P4 in the planes (100), (002) and (101) of hexagonal crystals 2H and in the plane (101) of rhombohedral crystals 3R. Therefore, these peak intensities will be explained.

Here, the measurements of X-ray diffraction profile have been used the so-called standardized values at home and abroad in recent years. This horizontal-sample-mounting-model multi-purpose X-ray diffractometer Ultima IV manufactured by Rigaku Corporation is an apparatus which can measure X-ray diffraction profile in accordance with JIS R 7651:2007 "Measurement of lattice parameters and crystallite sizes of carbon materials". In addition, Rate (3R) is the ratio of the diffraction intensity obtained by the Rate (3R)= P3/(P3+P4)×100, even if the value of the diffraction intensity is changed, the value of Rate (3R) is not changes. Means that the ratio of the diffraction intensity is standardized, it is commonly used to avoid performing the identification of the absolute value substance and its value does not depend on measurement devices.

As shown in FIG. 5 and Table 1, Sample 5 produced by the production apparatus B, which applies a treatment with a ball mill and a microwave treatment, had high rates of peak intensities P3 and P1, and a Rate (3R) defined by Equation 1 showing a rate of P3 to a sum of P3 and P4 was 46%. Additionally, the intensity ratio P1/P2 was 0.012.

$$\text{Rate}(3R)=P3/(P3+P4)\times 100 \quad \text{Equation 1}$$

wherein
P1 is a peak intensity of a (100) plane of the hexagonal graphite layer (2H) based on the X-ray diffraction method,
P2 is a peak intensity of a (002) plane of the hexagonal graphite layer (2H) based on the X-ray diffraction method,
P3 is a peak intensity of a (101) plane of the rhombohedral graphite layer (3R) based on the X-ray diffraction method, and
P4 is a peak intensity of a (101) plane of the hexagonal graphite layer (2H) based on the X-ray diffraction method.

TABLE 1

|  | Peak intensities [counts · deg] (2θ[°]) |
|---|---|
| Hexagonal crystals 2H (100) [P1] | 162 (42.33) |
| Hexagonal crystals 2H (002) [P2] | 13157 (26.50) |
| Rhombohedral crystals 3R (101) [P3] | 396 (43.34) |
| Hexagonal crystals 2H (101) [P4] | 466 (44.57) |

In the same manner, as shown in FIG. 6 and Table 2, Sample 6 produced by the production apparatus A, which applies a treatment based on the jet mill and a treatment based on plasma, had high rates of peak intensities P3 and P1, and the Rate (3R) was 51%. In addition, the intensity ratio P1/P2 was 0.01.4.

TABLE 2

|  | Peak intensities [counts · deg] (2θ[°]) |
|---|---|
| Hexagonal crystals 2H (100) [P1] | 66 (42.43) |
| Hexagonal crystals 2H (002) [P2] | 4,675 (26.49) |
| Rhombohedral crystals 3R (101) [P3] | 170 (43.37) |
| Hexagonal crystals 2H (101) [P4] | 162 (44.63) |

Furthermore, as shown in FIG. 7 and Table 3, Sample 1 indicating a comparative example produced with only the ball mill had a small rate of a peak. Intensity P3, compared with Samples 5 and 6, and the Rate (3R) was 23%. In addition, the intensity ratio P1/P2 was 0.008.

TABLE 3

|  | Peak intensities [counts · deg] (2θ[°]) |
| --- | --- |
| Hexagonal crystals 2H (100) [P1] | 120 (42.4) |
| Hexagonal crystals 2H (002) [P2] | 15,000 (26.5) |
| Rhombohedral crystals 3R (101) [P3] | 50 (43.3) |
| Hexagonal crystals 2H (101) [P4] | 160 (44.5) |

Figure 2:
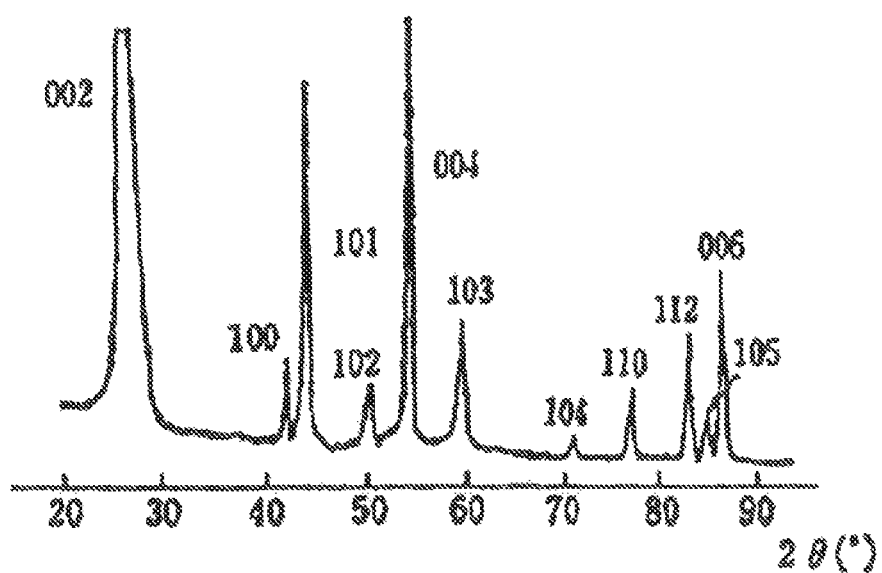
FIG. 2 is a diagram which shows an X-ray diffraction profile of general natural graphite.

Thus, Sample 5 produced by the production apparatus B of Example 1, and Sample 6 produced by the production apparatus A of Example 1 had Rates (3R) of 46% and 51%, respectively, and it was shown that their Rates (3R) were 40% or more, or 50% or more, compared with the natural graphite shown in FIG. 2 and Sample 1 indicating a comparative example.

Next, graphene dispersions were produced using the above-produced graphene precursors, and their easiness in exfoliation of graphene was evaluated.

<As to Graphene Dispersions>

Figure 8:
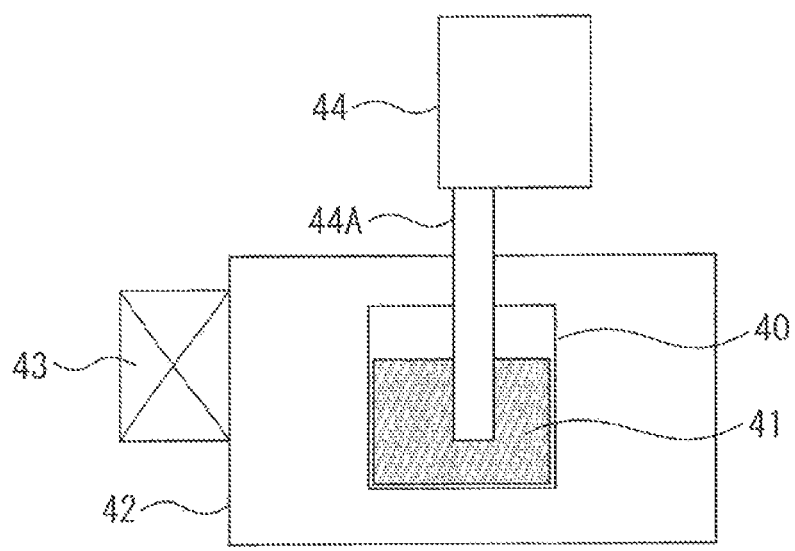
FIG. 8 is a diagram which shows a dispersion-producing apparatus which produces a dispersion using a graphite-based carbon material as a precursor.

A method for producing a graphene dispersion will be explained with reference to FIG. 8. FIG. 8 shows, as an example, a case where an ultrasonic treatment and a microwave treatment are combined in a liquid when a graphene dispersion is produced.

(1) 0.2 g of a graphite-based carbon material useful as a graphene precursor and 200 ml of N-methylpyrrolidone (NMP) which serves as dispersing medium are charged to a beaker 40.
(2) The beaker 40 is put into a chamber 42 of a microwave generator 43, and an ultrasonic trembler 44A of an ultrasonic horn 44 is inserted into dispersing medium 41 from the upper direction.
(3) The ultrasonic horn 44 is activated, and ultrasonic waves of 20 kHz (100 W) are continuously applied thereto for 3 hours.
(4) While the above ultrasonic horn 44 is actuated, the microwave generator 43 is activated to apply microwaves of 2.45 GHz (300 W) intermittently (irradiation for 10 seconds every 5 minutes) thereto.

Figure 9:
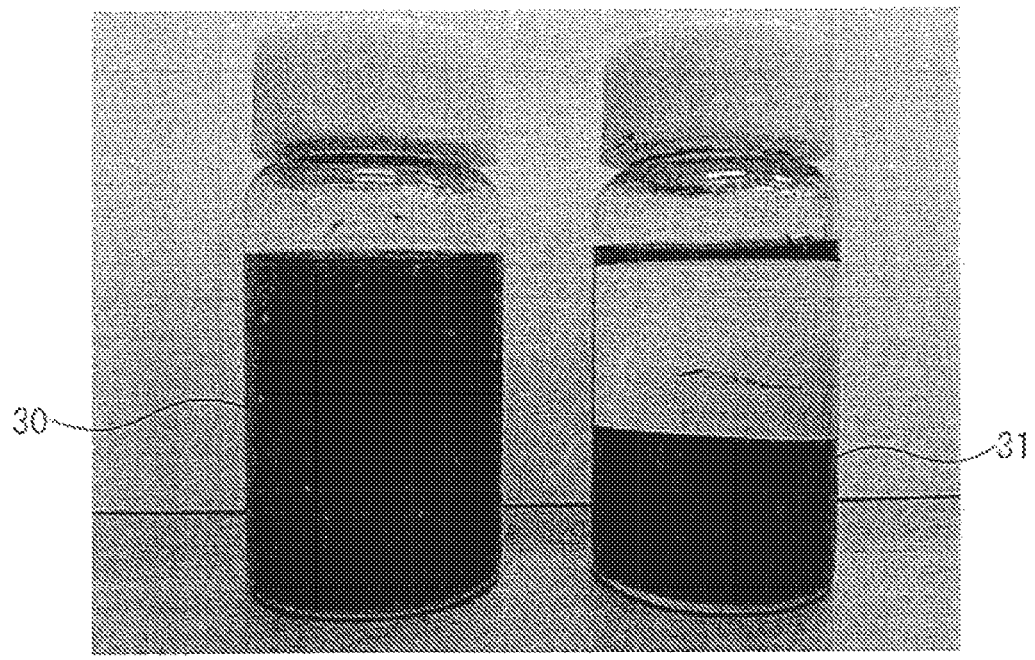
FIG. 9 is a diagram which shows dispersing states of dispersions produced by using graphite-based carbon materials of Sample 1 indicating a comparative example, and Sample 5 produced by the production apparatus B of Example 1.

FIG. 9 refers to appearances of graphene dispersions produced in the above-described way when 24 hours had passed.

Although a portion of the graphene dispersion 30 using Sample 5 produced by the production apparatus B was deposited, a product entirely showing a black color was observed. For this, it is considered that a large portion of the graphite-based carbon materials used as graphene precursors are dispersed in a state where graphene is exfoliated from them.

In the dispersion 31 using Sample 1 indicating a comparative example, most of the graphite-based carbon materials were deposited, and it was confirmed that a portion thereof floated as a supernatant. From the facts, it is considered that graphene was exfoliated from a small portion thereof and that they floated as the supernatant.

Furthermore, the graphene dispersion produced in the above-described way was diluted to an observable concentration, was coated onto a sample stage (TEM grid), and the grid was dried. Thus, the size and the number of layers of graphene was observed in the captured image of a transmission electron microscope (TEM), as shown in FIG. 10. In addition, the grid coated with the diluted supernatant was used for Sample 1. For example, in the case of FIG. 10, the size corresponds to a maximum length L of a flake 33, which was 600 nm, based on FIG. 10 (a). As for the number of layers, the end face of the flake 33 was observed in FIG. 10 (b), and overlapping graphene layers were counted, thereby calculating the number of layers as 6 layers (a portion indicated by the symbol 34). In this way, the size and the number of layers were measured with respect to each flake ("N" indicates the number of flakes), and the numbers of graphene layers and the sizes shown in FIGS. 11 and 12 were obtained.

Figure 11A:
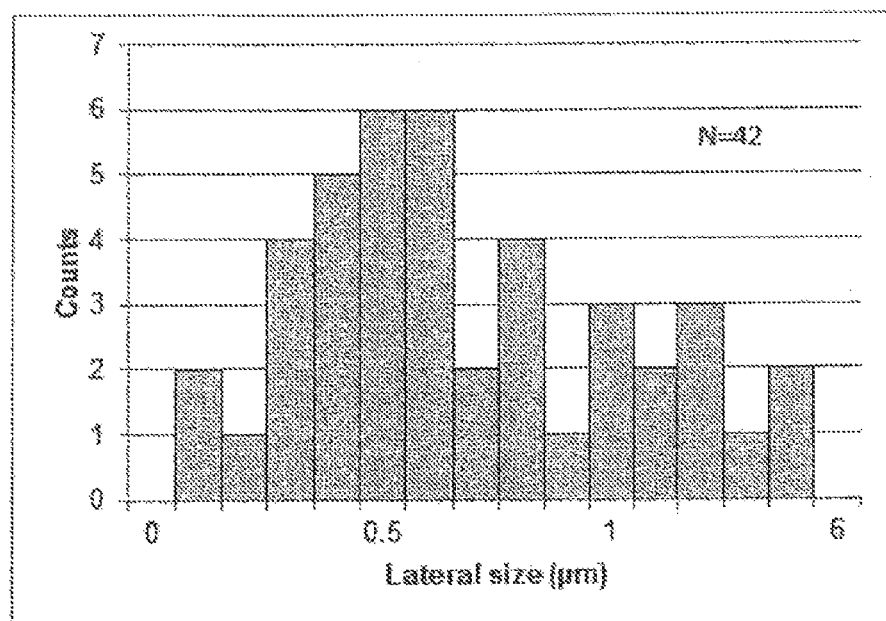
FIG. 11 is a figure which shows distribution states of a graphite-based carbon material dispersed in a dispersion which was produced using a graphite-based carbon material (precursor) of Sample 5, where (*a*) is a diagram which shows an average size distribution, which (*b*) is a diagram which shows a distribution of the number of layers.
Figure 11B:
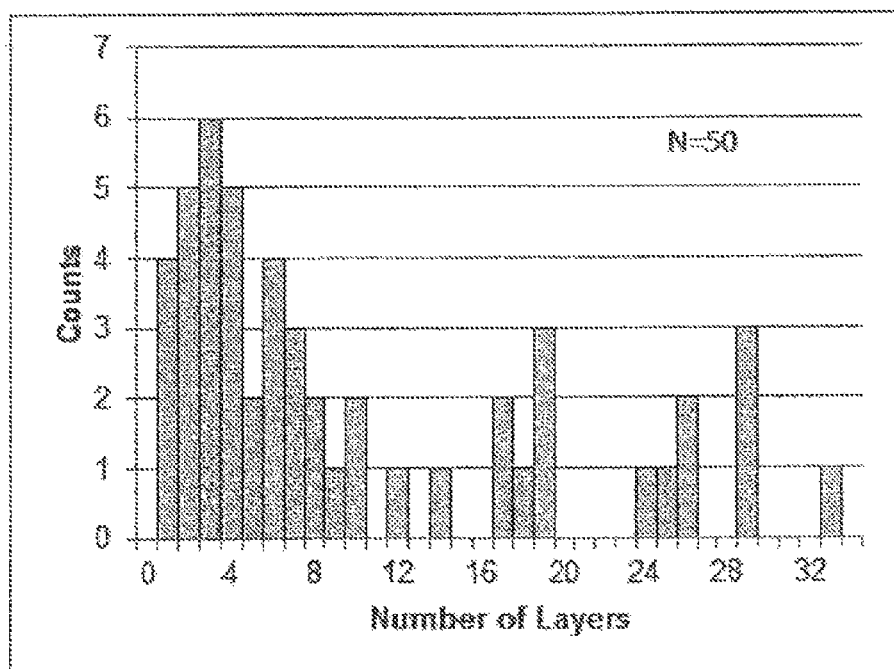

With reference to FIG. 11 (a), a particle size distribution (distribution of sizes) of thin flakes included in the graphene dispersion of Sample 5 (Rate (R3) of 46%) produced by the production apparatus B of Example 1 was a distribution having a peak of 0.5 μm. In addition, in FIG. 11 (b), as to the number of layers, a distribution which had a peak in 3 layers and in which graphene having 10 layers or less were 68% was observed.

Figure 12A:
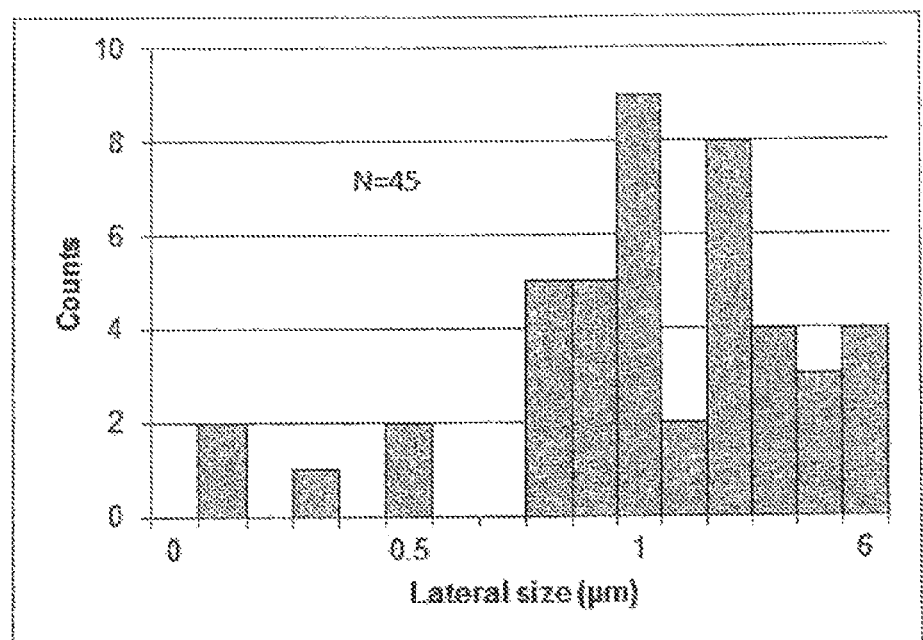
FIG. 12 is a figure which shows a distribution state of a graphite-based carbon material dispersed in a dispersion which was produced using a graphite-based carbon material of Sample 1 indicating the comparative example, where (*a*) is a diagram showing an average size distribution, and (*b*) is a diagram showing a distribution of the number of layers.
Figure 12B:
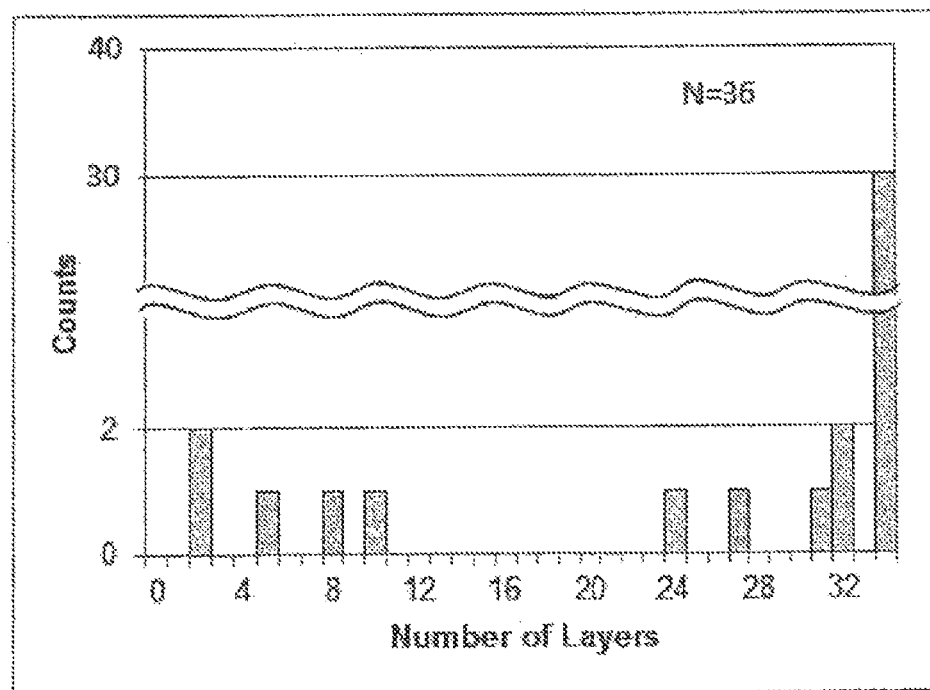

With reference to FIG. 12, a particle size distribution (distribution of sizes) of thin flakes included in the dispersion of Sample 1 (Rate (R3) of 23%) of the comparative example was a distribution having a peak of 0.9 μm. In addition, as for the number of layers, a distribution in which those having 30 layers or more occupied the greater portion and in which graphene having 10 layers or less were 10% was observed.

From the results, it was revealed that, when the product of Sample 5 produced by the production apparatus B was used as a graphene precursor, a highly-concentrated graphene dispersion which contains plenty of graphene of 10 layers or less and which has excellent dispersibility of graphene can be obtained.

Next, with reference to FIG. 13, a relation between the Rate (3R) of the graphene precursor and the number of layers in the graphene dispersion will be described. Samples 1, 5 and 6 in FIG. 13 are those described above. Samples 2, 3 and 4 were produced by the production apparatus B which carried out a treatment based on a ball mill and a microwave treatment, and were graphene dispersions produced using graphene precursors which had been produced by making the irradiating time of microwaves shorter than that for Sample 5. In addition, Sample 7 was produced by the production apparatus A which carried out a treatment based on a jet mill and a plasma treatment, and was a graphene dispersion produced by using a graphene precursor which had been produced by applying plasma of a higher output than that for Sample 6.

From FIG. 13, as to Samples 2 and 3 showing Rates (3R) of 31% and 38%, respectively, the distributions of the number of layers have peaks at around 13 as the number of layers; that is, the shapes of the distributions are close to that of a normal distribution (dispersions using Samples 2 and 3). As to Samples 4 to 7 showing Rates (3R) of 40% or more, the distributions of the number of layers have peaks at several as the number of layers (thin graphene); that is, the shapes of the distributions are those of a so-called lognormal distribution. On the other hand, as to Sample 1 having a Rate (3R) of 23%, the distribution thereof has a peak at 30 or more as the number of layers (a dispersion using Sample 1). That is, it is understood as follows: there is a tendency that, in cases where the Rate (3R) reaches 31% or more, the shapes of the layer number distributions differ from those for cases where the Rate (3R) is less than 31%; and further, in cases where the Rate (3R) reaches 40% or more, the shapes of the layer number distributions clearly differ from those for cases where the Rate (3R) is less than 40%. In addition, it can be understood that, as to proportions of graphene of 10 layers or less, the Rate (3R) of the dispersion using Sample 3 is 38%, while the Rate (3R) of the dispersion using Sample 4 is 62%, and that, when the Rate (3R) reaches 40% or more, a proportion of graphene of 10 layers or less rapidly increases.

From these facts, it can be considered that graphene of 10 layers or less are easily exfoliated in cases where the Rate (3R) is 31% or more, and that, as the Rate (3R) increases to 40%, 50% and 60%, graphene of 10 layers or less are more easily exfoliated. In addition, focusing on the intensity ratio P1/P2, Samples 2 to 7 show values within a comparatively narrow range of 0.012 to 0.016, and any of them are preferable because they exceed 0.01 where it is considered that graphene is easily exfoliated since crystal structures will be deformed.

Figure 14:
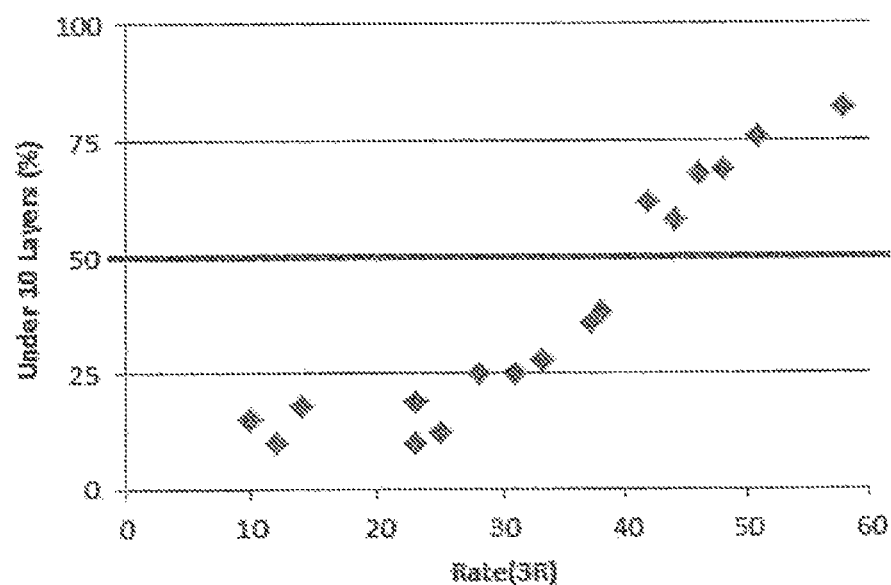
FIG. 14 is a diagram which shows proportions of graphene having 10 layers or less to a content of rhombohedral crystals dispersed in a dispersion.

Furthermore, results obtained by comparing Rates (3R) and proportions of graphene of 10 layers or less included therein are shown in FIG. 14. With reference to FIG. 14, it was revealed that, when the Rate (3R) reached 25% or more, around 31%, graphene of 10 layers or less started to increase (showing an ever-increasing slope). Further, it was revealed that, around 40%, graphene of 10 layers or less rapidly increased (as to proportions of graphene of 10 layers or less, whereas the Rate (3R) of the dispersion using Sample 3 was 38%, the Rate (3R) of the dispersion using Sample 4 was 62%, and the proportion of graphene of 10 layers or less rapidly increased by 24% as the Rate (3R) increased by 4%), and that a percentage of graphene of 10 layers or less against the total graphene was 50% or more. In addition, the points of black squares in FIG. 14 each correspond to different samples, and above-described Samples 1 to 7 and other samples are included therein.

From the facts, when a sample showing a Rate (3R) of 31% or more is used as a graphene precursor to produce a graphene dispersion, the proportion of distributed graphene of 10 layers or less starts increasing; further, when a sample showing a Rate (3R) of 40% or more is used as a graphene precursor to produce a graphene dispersion, 50% or more of graphene of 10 layers or less are produced. In other words, a graphene dispersion in which graphene is highly concentrated and highly dispersed can be obtained. Furthermore, because almost no graphite-based carbon materials (precursors) included in the dispersion deposit as described above, a concentrated graphene dispersion can easily be obtained. According to this method, even a graphene dispersion whose graphene concentration exceeded 10% can be produced without concentrating it. Particularly, the Rate (3R) is preferably 40% or more from a view point that the proportion of dispersed graphene of 10 layers or less sharply increases to 50% or more.

The above description clarifies the following: when the Rate (3R) is 31% or more, preferably 40% or more, and further preferably 50% or more, separation into graphene of 10 layers or less and thin graphite-based carbon materials of around 10 layers occurs in a greater proportion in many cases; and in the case where these graphite-based carbon materials are used as graphene precursors, a highly-concentrated graphene dispersion that has excellent dispersibility of graphene can be obtained. Still further, Example 5 to be described below clarifies that, in the case where the Rate (3R) is 31% or more, graphite-based carbon materials are useful as a graphene precursor.

Furthermore, an upper limit for the Rate (3R) is considered that the upper limit is not particularly defined. However, it is preferable that the upper limit is defined such that the intensity ratio P1/P2 simultaneously satisfies 0.01 or more, because graphene precursors are easily exfoliated when a dispersion or the like is produced. In addition, in cases of production methods using production apparatuses A and B, the upper limit is about 70%, from a viewpoint that graphene is easily produced. Also, a method combining a treatment based on the jet mill of the production apparatus A and a plasma treatment is more preferable, because a graphene precursor having a higher Rate (3R) can easily be obtained. Additionally, the Rate (3R) as long as it reaches 31% or more by combining the physical-force-based treatment and the radiowave-force-based treatment.

EXAMPLE 2

In Example 1, a case where the ultrasonic treatment and the microwave treatment were combined for obtaining a graphene dispersion is explained. In Example 2, only an ultrasonic treatment was carried out while a microwave treatment was not carried out, and other conditions were the same as those for Example 1.

Figure 15A:
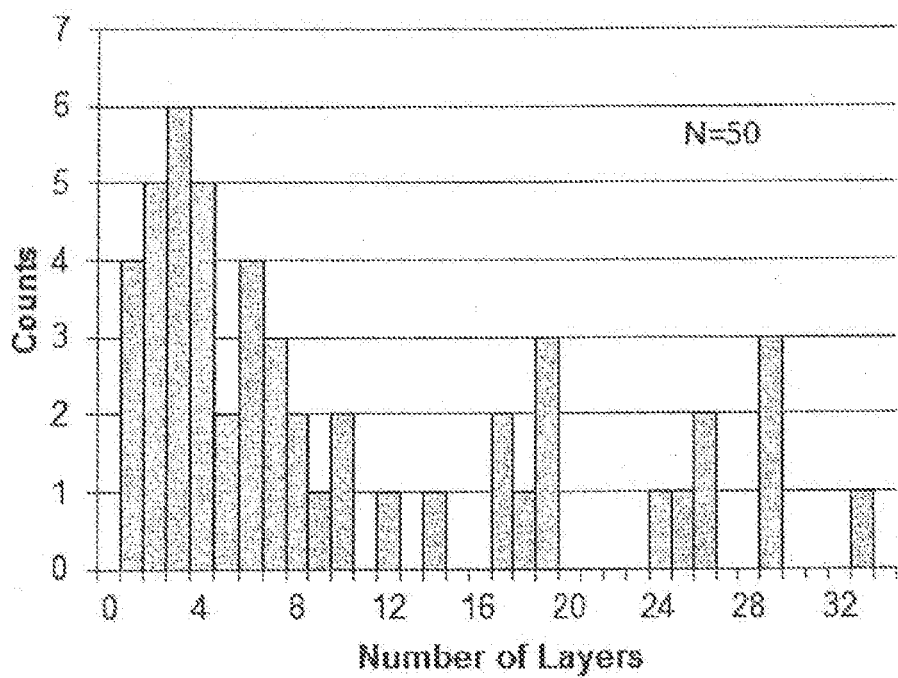
FIG. 15 is a figure which shows a distribution state of graphite when varying conditions for producing a dispersion using a graphite-based carbon material (precursor) of Sample 5 according to Example 2, where (*a*) is a diagram showing a distribution in a case where an ultrasonic treatment and a microwave treatment were combined, while (*b*) is a diagram showing a distribution of the number of layers in a case where an ultrasonic treatment was conducted.
Figure 15B:
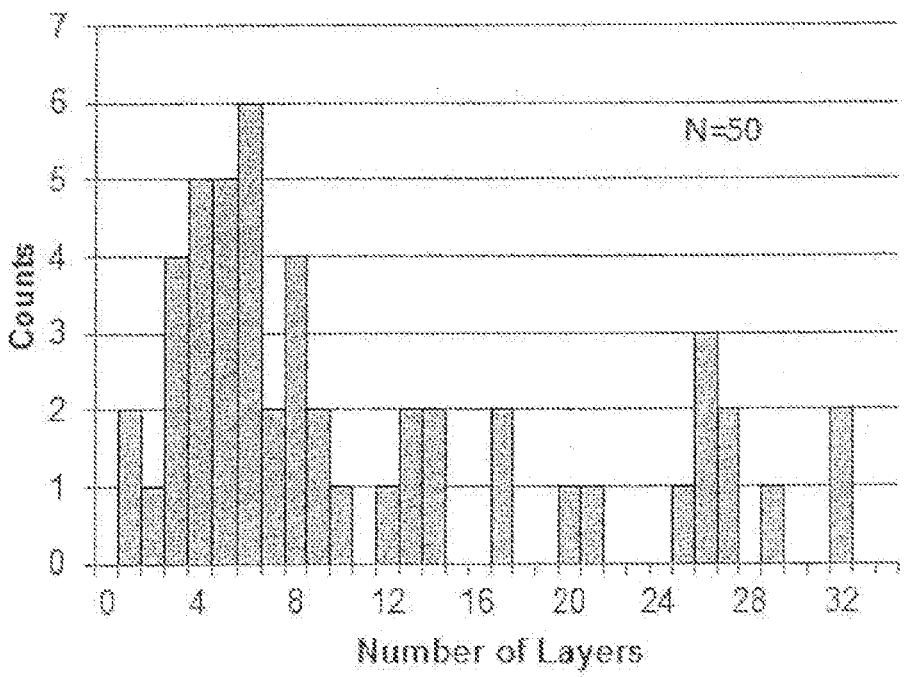
Figure 16:
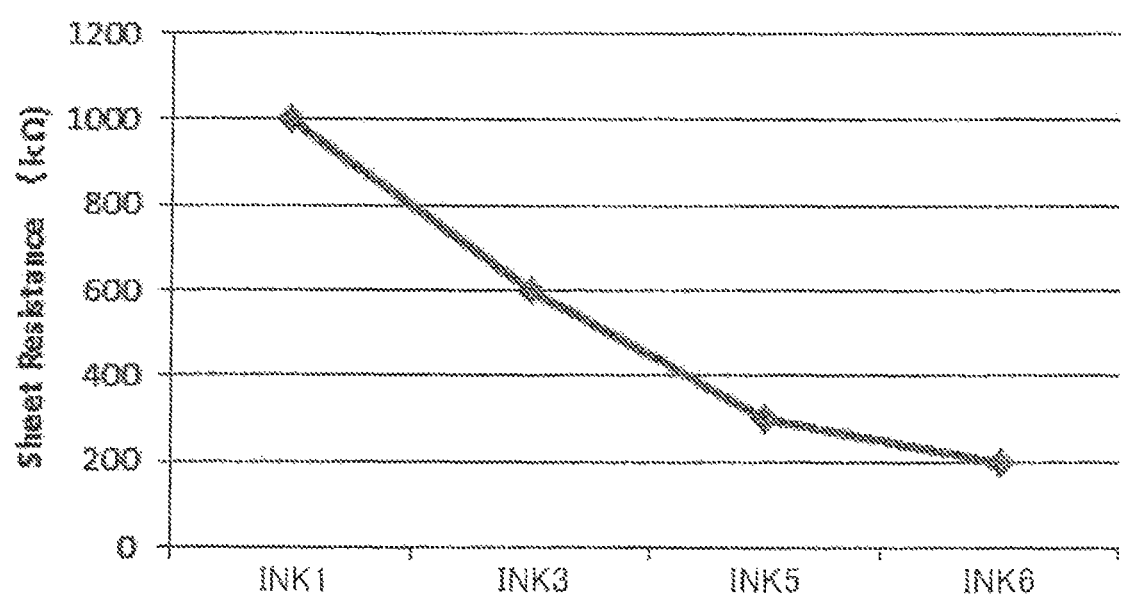
FIG. 16 is a diagram which shows a resistance value when a graphite-based carbon material of Example 3 was dispersed in a conductive ink.

FIG. 15 (*b*) shows a distribution of a number of layers with respect to a graphene dispersion which was obtained by carrying out an ultrasonic treatment using the graphene precursor of Sample 5 (Rate (3R)=46%) produced by the production apparatus B. In addition, FIG. 15 (*a*) is the same as the distribution shown in FIG. 11 (*b*) of Sample 5 produced by the production apparatus B of Example 1.

As a result, although the tendency of the distribution of the number of layers was almost similar, a proportion of graphene of 10 layers or less was 64%, and was slightly decreased, compared with 68% of Example 1. From the fact, it was revealed that it was more effective to simultaneously carry out two of the treatments based on a physical force and a radiowave force for producing a graphene dispersion.

EXAMPLE 3

In Example 3, an example used for a conductive ink will be described.

Sample 1 (Rate (3R)=23%), Sample 3 (Rate (3R)=38%), Sample 5 (Rate (3R)=46%) and Sample 6 (Rate (3R)=51%) of Example 1 were used as graphene precursors in mixture solution of water and an alcohol of the carbon number of 3 or less, which severed as a conductivity-imparting agent, at concentrations adopted for conductive inks, thus producing INK1, INK3, INK5 and INK6, and their resistance values were compared. Based on the results, as the Rates (3R) became higher, the resistance values were lower.

EXAMPLE 4

In Example 4, an example in which a graphene precursor was kneaded with a resin will be explained.

When a resin sheet, in which graphene was dispersed, was produced, the tensile strength was very superior although glass fibers were added thereto. Therefore, a factor for this was studied, and, consequently, a finding that a compatibilizer added simultaneously with the glass fibers contributed to formation of graphene from the precursor could be obtained. Therefore, products obtained by mixing dispersing agents and a compatibilizer into a resin were studied.

1 wt % of Sample 5 (Rate (3R)=46%) of Example 1 was added as a precursor directly to LLDPE (polyethylene), and the mixture was kneaded while applying shear (a shearing force) thereto with a kneader, two-shaft kneader (extruder) or the like.

It has been publicly known that, when a graphite-based carbon materials turned into graphene, being highly dispersed in a resin, the tensile strength increases. Therefore, by measuring a tensile strength of the resin, degrees of exfoliating into graphene and dispersion can relatively be estimated. The tensile strength was measured with an exact tabletop general-purpose testing machine (AUTOGRAPH AGS-J) manufactured by Shimadzu Corporation under a condition of test speed of 500 mm/min.

In addition, in order to compare degree of exfoliating into graphene and dispersibility depending on the presence or absence of additives, the following comparisons of three types of (a), (b) and (c) were carried out.
(a) No additives
(b) a general dispersing agent (zinc stearate)
(c) a compatibilizer (a graft-modified polymer)

Figure 17:
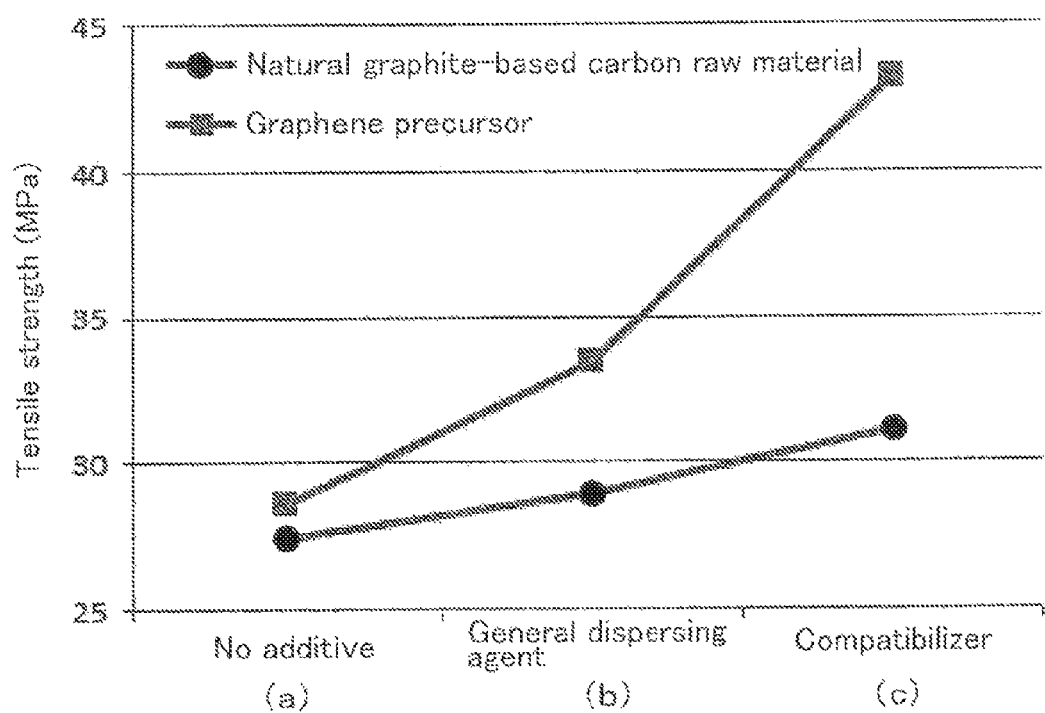
FIG. 17 is a diagram which shows a tensile strength when a graphite-based carbon material of Example 4 was kneaded with a resin.

With reference to FIG. 17 showing the measurement results, the results will be explained. In addition, in FIG. 17, circles refer to resin materials using Sample 1 of the comparative example, and squares refer to resin materials using Sample 5 of Example 1.

In case (a) where no additive was added, a difference of the tensile strengths was small.

In case (b) where the dispersing agent was added, it was revealed that formation of graphene was promoted to a certain degree in the graphene precursor of Sample 5.

In case (c) where the compatibilizer was added, it was revealed that that formation of graphene was significantly promoted in the graphene precursor of Sample 5. This is because it is considered that, besides effects to disperse graphene, the compatibilizer binds the graphene layer-bound bodies and the resin, and acts on them such that the graphene layer-bound bodies are stripped therefrom, when applying shear in that state.

Zinc stearate is explained above as an example of the dispersing agent. However, those suited for compounds may be selected. As examples of the dispersing agent, anionic (anion) surfactants, cationic (cation) surfactants, zwitterionic surfactants, and nonionic surfactants can be mentioned. In particular, anion surfactants and nonionic surfactants are preferable for graphene. Nonionic surfactants are more preferable. Since nonionic surfactants are surfactants which do not dissociate into ions and which show hydrophilic properties by hydrogen bonds with water, as observed in oxyethylene groups, hydroxyl groups, carbohydrate chains such as glucoside, and the like, there is a merit that they can be used in nonpolar solvents, although they do not have a strength of hydrophilicity as high as ionic surfactants. Further, this is because, by varying chain lengths of their hydrophilic groups, their properties can freely be changed from lipophilic properties to hydrophilic proper ties. As anionic surfactants, X acid salts (as for the X acid, for example, cholic acid, and deoxycholic acid), for example, SDC: sodium deoxycholate, and phosphate esters, are preferable. Furthermore, as nonionic surfactants, glycerol fatty acid esters, sorbitan fatty acid esters, fatty alcohol ethoxylates, polyoxyethylene alkyl phenyl ether, alkyl glycosides, and the like are preferable.

EXAMPLE 5

In order to further verify that those obtained when the Rate (3R) is 31% or more are beneficial as graphene precursors, which is described above in Example 1, an example in which a graphene precursor was kneaded with a resin will be further explained in Example 5. The following explains elastic moduli of resin molded articles in which graphite-based carbon materials containing Samples 1 to 7 in Example 1, having Rates (3R) plotted in FIG. 14, were used as precursors.

(1) Using the above-described graphite-based carbon material as a precursor, 5 wt % of LLDPE (polyethylene: 20201J produced by Prime Polymer Co., Ltd.) and 1 wt % of a dispersant (nonionic surfactant) were mixed in an ion-exchanged water, and the above-described device illustrated in FIG. 8 was actuated under the same conditions, whereby graphene dispersions containing 5 wt % of graphene and graphite-based carbon materials were obtained.

(2) 0.6 kg of the graphene dispersion obtained in (1) was immediately kneaded into a resin of 5.4 kg using a kneader (pressing-type kneader WDS7-30 produced by Moriyama Co., Ltd.), whereby pellets were produced. The kneading conditions are to be described below. It should be noted that the mixing ratio between the resin and the dispersion was selected so that the amount of the graphene and graphite-based carbon materials mixed therein was eventually 0.5 wt %.

(3) The pellets produced in (2) were formed into a test piece according to JIS K7161 1A (length: 165 mm, width: 20 mm, thickness: 4 mm) by an injection molding machine.

(4) The elastic modulus (Mpa) of the test piece produced in (3) was measured under a condition of test speed of 500 mm/min according to JIS K7161 by a table-top type precision universal tester produced by Shimadzu Corporation (AUTOGRAPH AGS-J).

The kneading conditions were as follows.
Kneading temperature: 135° C.
Rotor rotation speed: 30 rpm
Kneading time: 15 minutes
Pressurization in furnace: applying 0.3 MPa for 10 minutes after start, and depressurizing to atmospheric pressure after the 10 minutes elapsed Here, the dispersion of the above-described graphene dispersion into a resin is considered as follows. As the melting point of a resin is generally 100° C. or higher, water evaporates in atmosphere, but in a pressing-type kneader, the inside of a furnace can be pressurized. In the inside of the furnace, the boiling point of water is raised so that the dispersion is kept in a liquid form, whereby an emulsion of the dispersion and the resin can be obtained. After applying pressure for a predetermined time, the inside is gradually depressurized, which causes the boiling point of water to decrease, thereby allowing water to evaporate. Here, graphene confined in water are left in the resin. This causes graphene and graphite-based carbon materials to be dispersed at a high concentration in the resin.

Further, since the graphene and graphite-based carbon materials tend to precipitate in the graphene dispersion as time elapses, the graphene dispersion is kneaded into the resin preferably immediately after the graphene dispersion is obtained.

It should be noted that the following may be used as the means for obtaining the emulsion of the dispersion and the resin, other than the pressing kneader: a chemical thruster; a vortex mixer; a homomixer; a high-pressure homogenizer; a hydroshear; a flow jet mixer; a wet jet mill; and an ultrasonic generator.

Further, the following may be used as a solvent for the dispersion, other than water: 2-propanol (IPA); acetone; toluene; N-methylpyrrolidone (NMP); and N,N-dimethyl formamide (DMF).

Table 4 illustrates the relationship between the Rates (3R) of around 30% and the elastic moduli of resin molded articles. It should be noted that Sample 00 in Table 4 is a blank Sample in which no precursor was kneaded, Samples 11 and 12 have Rates (3R) between that of Sample 1 and that of Sample 2, and Sample 21 has a Rate (3R) between that of Sample 2 and that of Sample 3.

TABLE 4

| | Sample No. | | | | | | | |
|---|---|---|---|---|---|---|---|---|
| | 00 | 1 | 11 | 12 | 2 | 21 | 3 | 4 |
| P3/(P3 + P4) | — | 23% | 25% | 28% | 31% | 35% | 38% | 42% |
| Elastic modulus (MPa) (Average in 5 times) | 175 | 197 | 196 | 199 | 231 | 249 | 263 | 272 |
| Difference from blank | — | 12.4% | 12.0% | 13.9% | 31.7% | 42.1% | 50.0% | 55.6% |
| Under-10 layers upon dispersion in NMP (Reference) | — | 10% | 12% | 25% | 25% | 30% | 38% | 62% |

Figure 18:
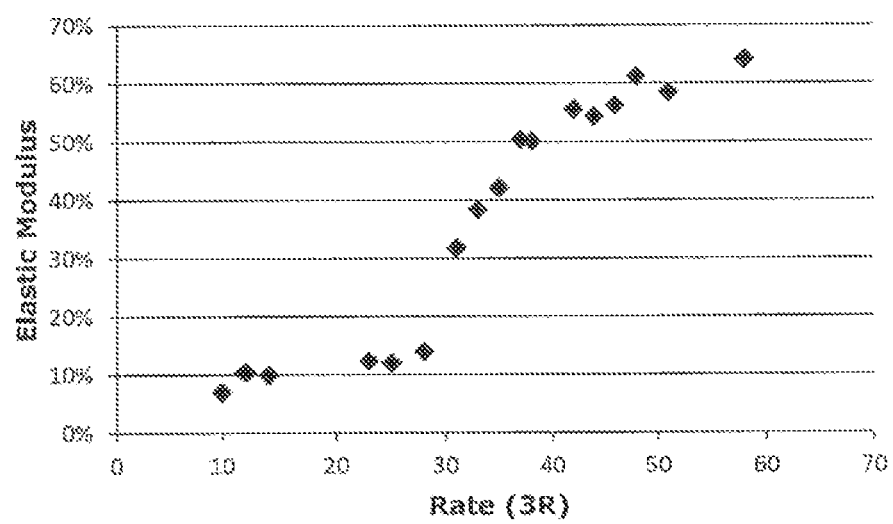
FIG. 18 is a diagram which shows a tensile strength when a graphite-based carbon material of Example 5 was kneaded with a resin.

FIG. 18 and Table 4 prove that the difference of the elastic modulus with respect to that of Sample 00 (blank) (increase ratio of the elastic modulus) is approximately uniform around 10% until the Rate (3R) reaches 31%; after the Rate (3R) reaches 31%, the difference sharply increases to 32%; while the Rate (3R) increases from 31% to 42%, the difference monotonously increases to 50%; and after the Rate (3R) reaches 42%, the difference slightly increases and converges to around 60%. In this way, when the Rate (3R) is 31% or more, a resin molded article having an excellent elastic modulus can be obtained. Further, since the amount of graphene and graphite-based carbon materials contained in a resin molded article is 0.5 wt %, which is small, influence on properties that the resin originally possesses is small.

It is considered that this tendency attributes to a sharp increase in a thin graphite-based carbon material containing graphene having 10 or less layers in contact with a resin after the Rate (3R) reaches 31%. Here, in Example 5, it is impossible to determine the number of layers of graphene by observation with TEM due to influences of a dispersant used for dispersion in water. Then, only for reference, the reason for the sharp increase described above is considered based on the distribution of the numbers of layers of the graphite-based carbon material illustrated in Table 4 upon dispersion in NMP. Sample 12 and Sample 2 are compared with each other, and it is found that both of the proportions of graphene (the number of layers are 10 or less) were 25%. On the other hand, as illustrated in FIG. 19, as to Sample 2, the proportion of thin ones having less than 15 layers was greater as compared with Sample 12; in other words, the graphite-based carbon material dispersed as a precursor had a larger surface area, which means that the area thereof in contact with the resin sharply increased.

In this way, Example 5 clearly indicates that when the Rate (3R) is 31% or more, a graphite-based carbon material used as a graphene precursor tends to be separated into graphene having 10 or less layers and a thin graphite-based carbon material.

EXAMPLE 6

Experiments were performed to obtain a positive electrode of a lithium-ion secondary battery using the graphene precursor produced by the above methods.

<Various Conditions>
Solvent: NMP (N-methylpyrrolidone) (battery grade manufactured by Mitsubishi Chemical Corp.).
Conductive assistant (conductive material): Acetylene black (HS-100 manufactured by Denki Kagaku Kogyo Kabushiki Kaisha, average particle diameter of 48 nm, bulk density of 0.15 g/ml, ash content of 0.01%),
Graphite-based carbon material: Graphene precursor (produced by above method),
Binding agent: PVdF (PolyVinylidene) (SolefTA5130 manufactured by Solvay),
Positive electrode active material (base material): NCM Li (Ni$_{1/3}$, Co$_{1/3}$, Mn$_{1/3}$)O$_2$) manufactured by Mitsui Mining & Smelting Co., Ltd. (average particle diameter of 30 μm),
Ultrasonic treatment device (UP100S manufactured by Hielscher Ultrasonics GmbH),
  <Treatment condition: 20 kHz, 100 W>
  <Dispersion condition 1: Same as the preparing method of the dispersion of the exfoliated graphene precursors in Example 1 (FIG. 8). Applying conditions of ultrasonic waves and microwaves are also the same.>
Mixer (ARE-310 manufactured by THINKY),
  <Mixing condition 1: Normal temperature of 25° C., mixing at 2,000 rpm×10 min>
  <Mixing condition 2: Normal temperature of 25° C., mixing at 2,000 rpm×10 min, defoaming after mixing at 2,100 rpm×30 sec>,
Separator (2400 manufactured by Celgard, LLC., plate thickness of 25 μm, material: PP (polypropylene)),
Electrolyte solution: EC (ethylene carbonate) containing 1.0 mol/L of LiPF6 (lithium hexafluorophosphate): DEC (diethyl carbonate) (7:3 vol %) (manufactured by Kishida Chemical Co., Ltd.),
Lithium foil (negative electrode): (manufactured by Honjo Metal Co., Ltd., thickness of 0.2 mm)
<Experimental Procedures>
Step 1. To NMP (90 g), 1.0 g of graphene precursors (see Samples 1, 2, 21, and 4 (Samples used in Examples 1 and 5)) are added, and, under the dispersion condition 1, the graphene precursors are exfoliated and dispersed to obtain a dispersion of 10 wt % in concentration.
Step 2. The dispersion (20 g), PVdF (4 g), and acetylene black (6 g) are added and mixed under the mixing condition 0.1 to obtain a 30 g of mixture 1.
Step 3. To the mixture 1, positive electrode active materials are added at a ratio shown in Table 5 and mixed under the mixing condition 2 to obtain a mixture 2.
Step 4. The mixture 2 is coated on an aluminum foil to a film thickness of 0.25 mm, and the coating material is vacuum-dried at 100° C. and pressed by a pressure of 1.5 MPa to obtain a positive electrode having a given thickness.

Step 5. The positive electrode is punched into a shape having a diameter of 15 mm.

Step 6. The lithium foil is pressed and fixed to a stainless steel panel serving as a negative electrode, the separator, the electrolyte solution, and the positive electrode were overlaid in this order, and the overlaid product was mounted on an HS cell made of stainless steel manufactured by Hohsen Corp.

Step 7. Electrochemical characteristic evaluation of the HS cell was performed under the following test conditions.

It should be noted that, in the above procedures, a transition to the next step was performed successively without having a standby time. The same applied to the following examples.

<Test Conditions>
Initial charging: CC-CV charging 0.2 C (0.01 C cut off)
Initial discharging: CC discharging 0.2 C
Assembling environment: 25° C., a dew point of −64° C. under argon atmosphere (inside of a glove box)
Voltage range: 2.75 V to 4.5 V vs. Li/Li+
Measuring device: BTS2004W manufactured by Nagano Co., Ltd.

It is noted that CC-CV charging refers to constant-voltage/constant-current charging and CC discharging refers to constant-current discharging, while 0.2 C is a charge/discharge rate in 5 hours and 0.01 C cut off represents a cut-off condition.

Further, in order to confirm an effect of graphene-like graphite, experiments were performed with a Rate (3R) of 23% (Sample 1), 31% (Sample 2), 35% (Sample 21), and 42% (Sample 4) having a mixture ratio shown in Table 5.

TABLE 5

| | | | | Mixture ratio (wt %) | | | |
|---|---|---|---|---|---|---|---|
| | | | | Graphene precursor | | | |
| | NCM | AB | PVdF | Rate (3R) = 23% (Sample 1) | Rate (3R) = 31% (Sample 2) | Rate (3R) = 35% (Sample 21) | Rate (3R) = 42% (Sample 4) |
| Example 6-1 | 94 | 3 | 2 | — | 1 | — | — |
| Example 6-2 | 94 | 3 | 2 | — | — | 1 | — |
| Example 6-3 | 94 | 3 | 2 | — | — | — | 1 |
| Comparative example 6-1 | 94 | 3 | 2 | 1 | — | — | — |
| Comparative example 6-2 | 95 | 3 | 2 | — | — | — | — |
| Comparative example 6-3 | 95 | — | 2 | — | 3 | — | — |

Figure 20A:
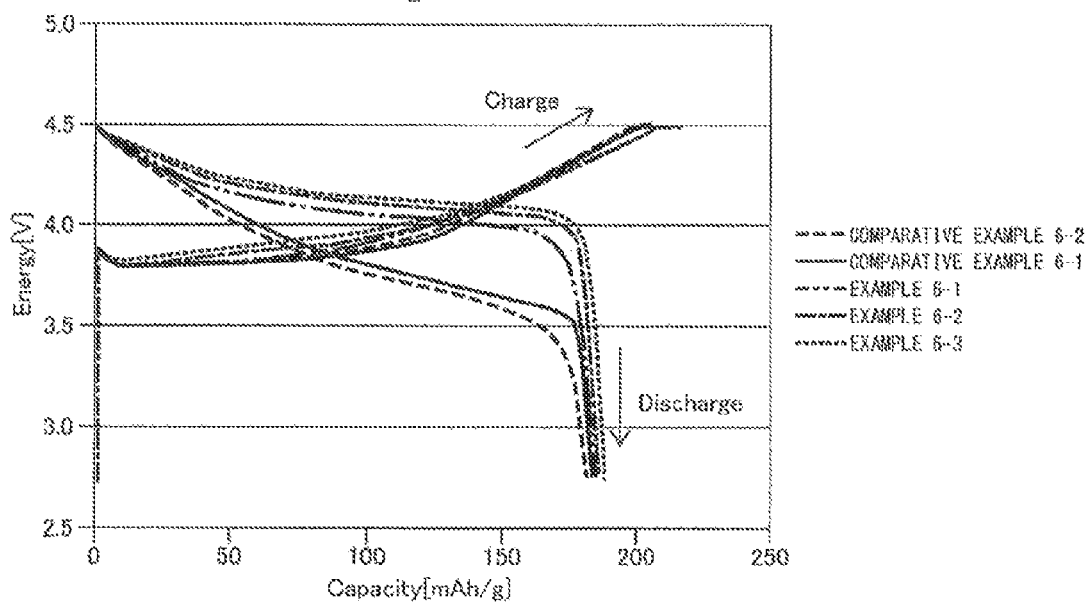
FIG. 20 is a graph which shows charging and discharging characteristics of a lithium-ion secondary battery in Example 6, where (*a*) is a graph representing Examples 6-1 to 6-3 and Comparative Examples 6-1 and 6-2, and (*b*) is a graph representing Comparative Example 6-3.
Figure 20B:
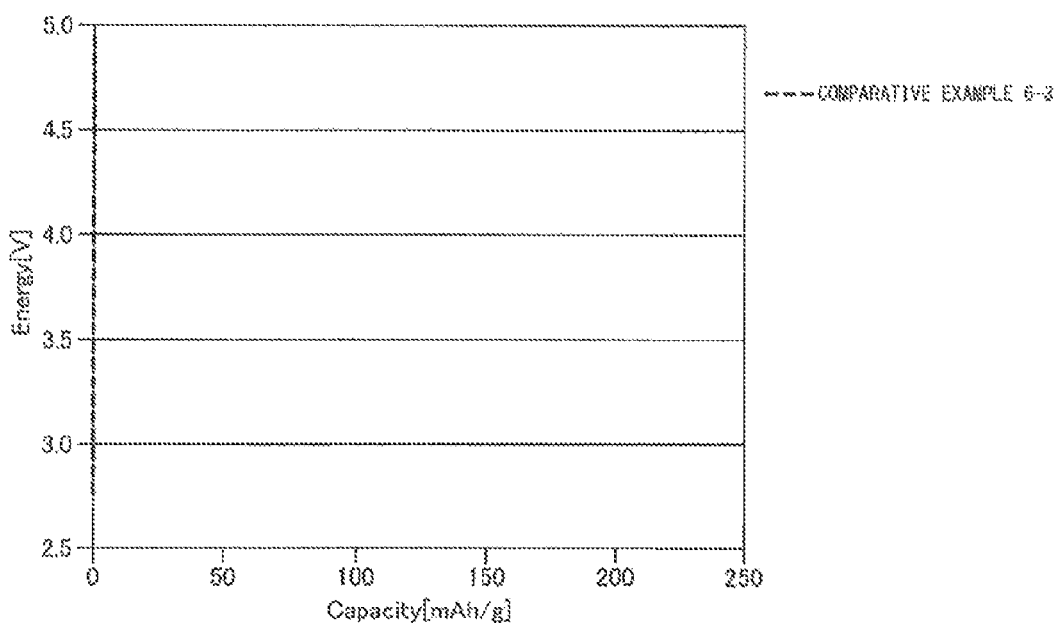

From Table 5 and FIG. 20, Examples 6-1, 6-2, 6-3, Comparative example 6-1, and Comparative example 6-2 in which the graphene-like graphite was not dispersed indicated a similar trend in charging characteristic when charging was conducted to a charging potential of 4.5 V at a rate of 0.2 C. Examples 6-1, 6-2, and 6-3, especially Example 6-3 by comparison, are more preferable since a charging voltage is quickly increased. In contrast, a charge behavior failed to be observed in Comparative example 6-3. It is speculated that this is because a conductive path couldn't be formed by nanoparticles such as the graphene-like graphite alone without having materials in a string-like shape such as acetylene black.

Further, as for discharging characteristics, it was observed that Examples 6-1, 6-2, and 6-3 had a higher charge end potential than Comparative examples 6-1 and 6-2. It was further observed that Examples 6-1, 6-2, 6-3, and Comparative example 6-1, in all of which the graphene-like graphite was dispersed, had a greater capacity than Comparative example 6-2, where the graphene-like graphite was not dispersed. It was observed that the capacity is significantly increased especially in Examples 6-1, 6-2, and 6-3. On the other hand, a discharge behavior failed to be observed in Comparative example 6-3.

Figure 21:
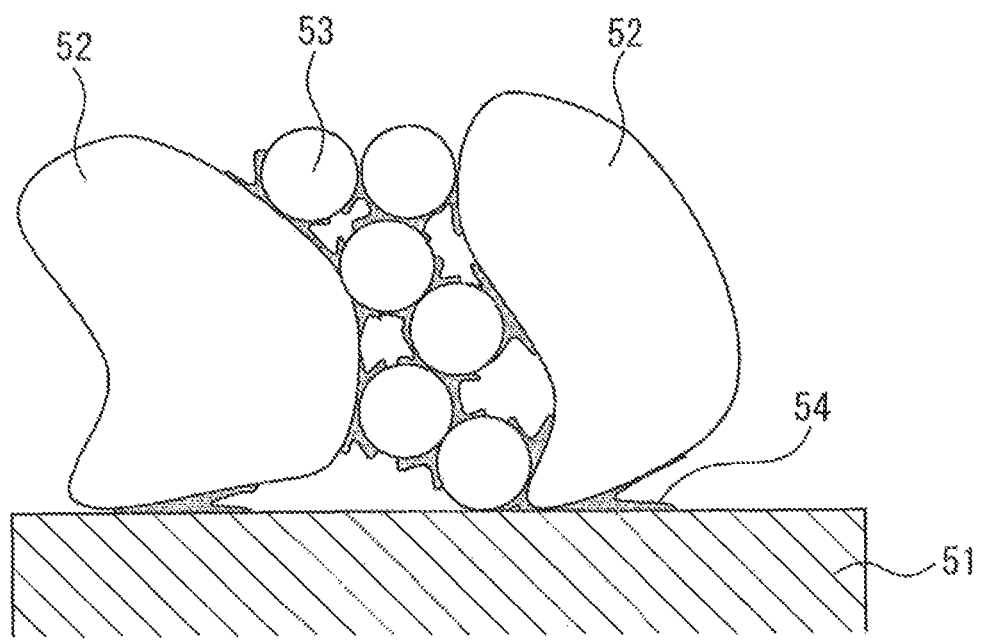
FIG. 21 is a conceptual drawing which shows a positive electrode of a lithium-ion secondary battery in Example 6.

By using the graphene-like graphite exfoliated from the graphene precursors having the Rate (3R) of 31% or more (Examples 6-1, 6-2, and 6-3) together with AB, it was confirmed that a resulting battery exhibited a high charge end potential and was excellent in the discharging characteristic of a positive electrode. Especially, from FIG. 20, it was confirmed that the charge end potential showed a tendency to increase sharply after the Rate (3R) reached 31%. It is speculated that, as shown in FIG. 21, between positive electrode active materials 52 and 52, having a particle diameter of several tens of μm, there exist conductive assistants AB53, 53, . . . , 53, formed in a string-like shape, having a cross sectional diameter of several tens of nm, and that graphene-like graphite 54 (e.g., a thickness of 50 nm or less, a size of 100 nm to 5 μm) is dispersed each between the positive electrode active material 52 and AB53, AB53 and AB53, aluminum foil 51 and the positive electrode active material 52, and the aluminum foil 51 and AB53. Moreover, since the graphene-like graphite 54 is in a planar shape and flexible as compared with other materials such as the aluminum foil 51, the positive electrode active material 52, and AB53, it is considered that the aluminum foil 51, the positive electrode active material 52, and AB53 are brought into a close contact with each other via the graphene-like graphite 54, thus discharging characteristics of a positive electrode is improved. In contrast, in the graphene precursors having the Rate (3R) of less than 31% (Comparative example 6-1), it is considered that an amount of the graphene-like graphite that is dispersed is too small so that an effect of adding the graphene-like graphite is not sufficiently exerted.

As the Rate (3R) of the graphene precursors increases to 35% (Example 6-2) and 42% (Example 6-3), discharging characteristics and capacity of the positive electrode are improved as compared with a case of the Rate (3R) being equal to or lower than that. This is because, it is considered that, as compared with a case of the Rate (3R) being 31% (Example 6-1), the number and a contact area of the graphene-like graphite 54, which brings the aluminum foil 51, the positive electrode active material 52, and AB53 into a contact with each other, are increased.

Further, because the graphene precursors are produced by a radiowave force-based treatment and/or a physical force-based treatment as described above, it is not necessary to perform an oxidation/reduction treatment. Further, because a reduction treatment is not necessary to produce a positive electrode, high temperature is not required, thus a positive electrode is readily produced. In addition, a positive electrode is produced under the kneading conditions 1 and 2 as well as by vacuum drying, thus the production thereof is simple.

Further, before being kneaded into the positive electrode active materials 52, a dispersion in which the graphene-like graphite is dispersed under the dispersion condition 1 is kneaded into AB53, thus the graphene-like graphite 54 and AB53 are mixed well by the kneading condition 1. The mixture is then kneaded into the positive electrode active materials 52, so that the graphene-like graphite 54 is dispersed uniformly.

It should be noted that, in the dispersion obtained in Step 1, materials exfoliated from the graphene precursors are dispersed. As described above, a part or whole of the graphene precursors is exfoliated to produce a mixed material containing material from the graphene precursors to the graphene, which is referred to as "graphene-like graphite". The graphene-like graphite dispersed in the dispersion is not illustrated, however, it can be observed by a transmission electron microscope (TEM) in the same manner as the graphene shown in FIG. 10.

Figure 22:
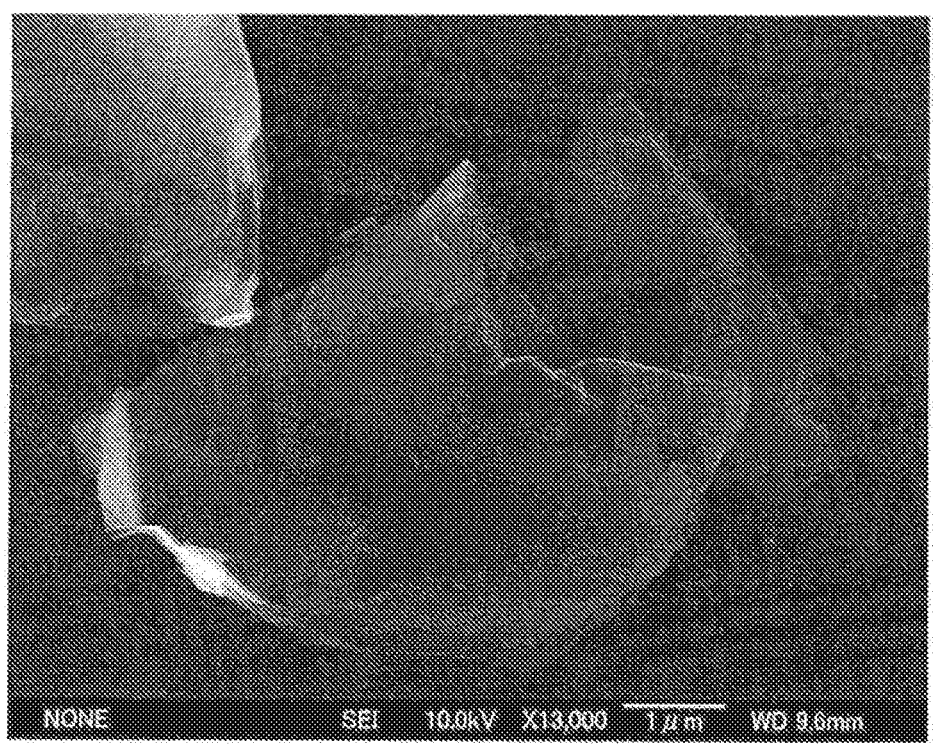
FIG. 22 is a SEM photographed image (plan view) of a graphene precursor.
Figure 23:
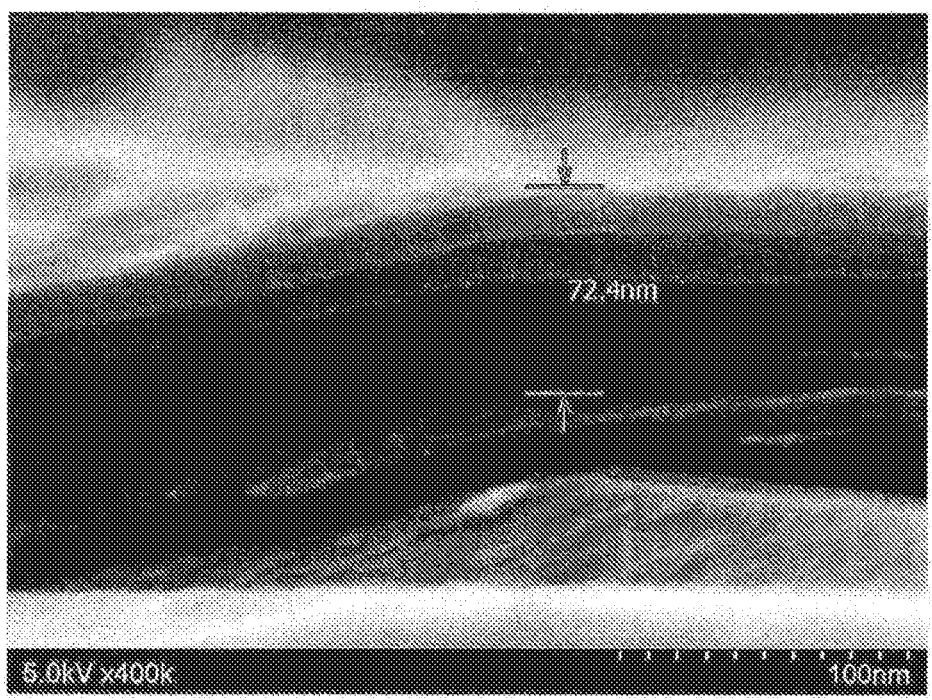
FIG. 23 is a SEM photographed image (side view) of a graphene precursor.

For reference, an explanation is given on photographed images of the graphene precursors taken by a scanning electron microscope (SEM). The graphene precursors obtained in Example 1 are a laminate of flaky graphite having a length of 7 μm and a thickness of 0.1 μm as shown for example in FIGS. 22 and 23.

EXAMPLE 7

Experiments were performed to obtain a positive electrode of a lithium-ion secondary battery using the graphene precursors produced in the above methods.

In Example 7, carbon nanotubes were used as a conductive material and the experiments were performed with a mixture ratio in Table 6.1. The rest is the same as in Example 6.

<Various Conditions>

Carbon nanotube: VGCF-H manufactured by Showa Denko K. K. (fiber diameter of 150 nm, fiber length of 10 to 20 μm)

Figure 24:
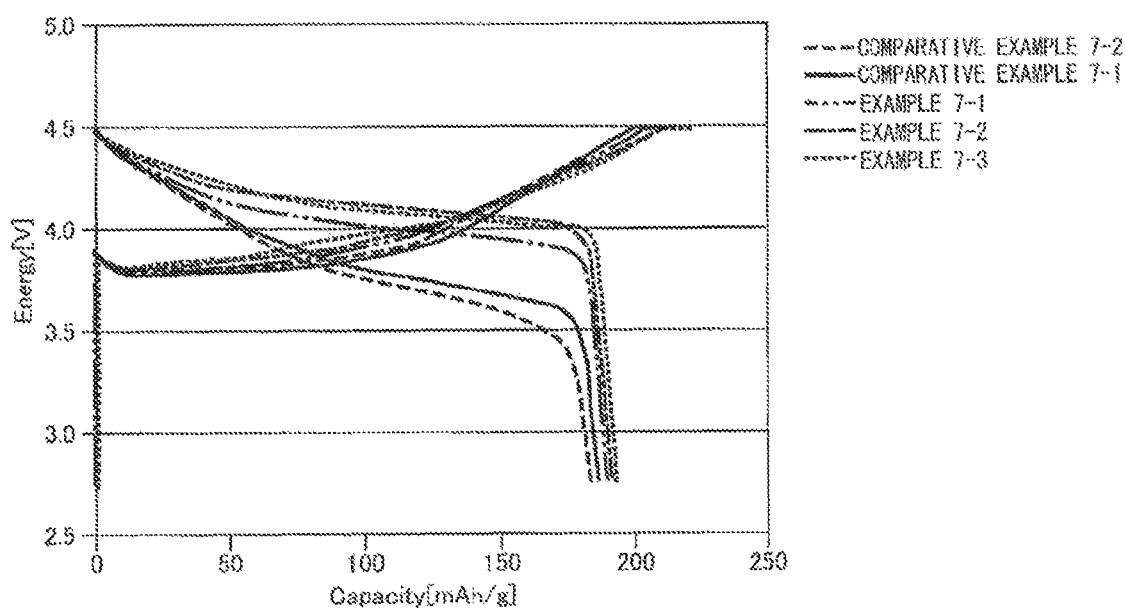
FIG. 24 is a graph which shows charging and discharging characteristics of a lithium-ion secondary battery in which carbon nanotubes are added in Example 7.

As shown in FIG. 24, a similar tendency to Example 6 was observed. By using the carbon nanotubes, charging and discharging characteristics was slightly improved overall compared with a case of using AB.

EXAMPLE 8

Experiments were performed to obtain a positive electrode of a lithium-ion secondary battery using the graphene precursors produced in the above methods.

In Example 8, a mixture ratio of the graphene precursors having the Rate (3R) of 31% to conductive materials was changed under conditions shown in Table 7 to perform experiments. The rest is the same as in Example 6.

TABLE 7

| | Mixture ratio (wt %) | | | |
|---|---|---|---|---|
| | NCM | AB | PVdF | Graphene precursor Rate (3R) = 31% (Sample 2) |
| Example 6-1 | 94 | 3 | 2 | 1 |
| Example 8-1 | 93 | 3 | 2 | 2 |
| Example 8-2 | 92 | 3 | 2 | 3 |
| Example 8-3 | 91 | 3 | 2 | 4 |
| Example 8-4 | 90 | 3 | 2 | 5 |
| Example 8-5 | 94.5 | 3 | 2 | 0.5 |
| Example 8-6 | 94.9 | 3 | 2 | 0.1 |
| Example 8-7 | 94.95 | 3 | 2 | 0.05 |
| Comparative example 6-2 | 95 | 3 | 2 | — |

Figure 25:
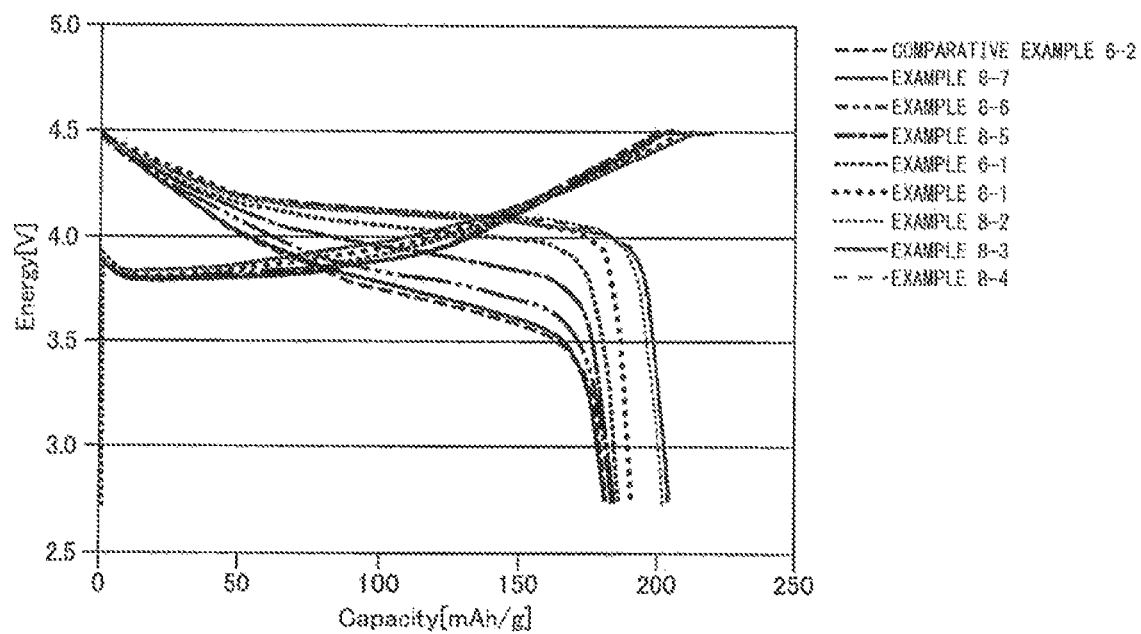
FIG. 25 is a graph which shows charging and discharging characteristics of a lithium-ion secondary battery in which a mixture ratio of a graphene precursor is changed in Example 8.

As shown in FIG. 25, when the mixture ratio of the graphene precursors to the conductive materials is greater than 1 (Example 8-2), a mostly similar trend in charging and discharging characteristics was observed, showing that the characteristics was saturated. Further, when the mixture ratio of the graphene precursors was 10 or more, an impact on properties of base materials becomes significant. On the other hand, when the mixture ratio was less than 1/50 (Example 8-7), a mostly similar trend was observed to a case where the graphene precursors were not mixed (Comparative example 6-2), and when the mixture ratio was 1/10 or more (Example 8-6), improvement of charging and discharging characteristics was observed. Based on these, a lower limit of the mixture ratio is 1/50 or more, preferably 1/10 or more, and an upper limit thereof is 10 or less, preferably 1 or less.

EXAMPLE 9

Next, experiments were per formed to obtain a resin molded article using the graphene precursors produced in the above methods.

TABLE 6

| | Mixture ratio (wt %) | | | | | | |
|---|---|---|---|---|---|---|---|
| | | | | Graphene precursor | | | |
| | NCM | VGCF-H | PVdF | Rate (3R) = 23% (Sample 1) | Rate (3R) = 31% (Sample 2) | Rate (3R) = 35% (Sample 21) | Rate (3R) = 42% (Sample 4) |
| Example 7-1 | 94 | 3 | 2 | — | 1 | — | — |
| Example 7-2 | 94 | 3 | 2 | — | — | 1 | — |
| Example 7-3 | 94 | 3 | 2 | — | — | — | 1 |
| Comparative example 7-1 | 94 | 3 | 2 | 1 | — | — | — |
| Comparative example 7-2 | 95 | 3 | 2 | — | — | — | — |

<Various Conditions>
<<Materials>>
Resin: LLDPE (polyethylene: 20201J manufactured by Prime Polymer Co., Ltd.), Solvent: Water (ion exchange water),
Dispersant: 1 wt % (nonionic surfactant),
Ultrasonic treatment device (UP100S manufactured by Hielscher Ultrasonics GmbH),
<Treatment condition: 20 kHz, 100 W>
<Dispersion condition 2: Graphene precursors are mixed with ion exchange water together with 1 wt % of a dispersant (nonionic surfactant), and the mixture was processed with the aforementioned device shown in FIG. 8 operated under the same condition to obtain a dispersion having 10 wt % of graphene-like graphite.>
<<Kneader>>
Kneader: Pressing-type kneader WDS7-30 manufactured by Moriyama Co., Ltd.,
Kneading temperature: 135° C.,
Rotor rotation speed: 30 r/min,
Processing time: 15 min,
Mixture ratio: Resin 5,340 g. AB (HS-100) 600 g, dispersion 600 g (60 g in terms of graphene-like graphite).
<<Volume Resistance Value>>
Test piece: ø100 mm×t3 mm (ASTM D257),
Measuring device: Device body (R-503 manufactured by Kawaguchi Electric Works Co., Ltd), electrode device (P-616 manufactured by Kawaguchi Electric Works Co., Ltd),
Applied voltage: 500 V,
Electric current is measured 1 min after applying voltage,
<<Thermal Conductivity>>
Test piece: ø50 mm×t3 mm (ASTM E1530),
Measuring device: UNITHERM 2021 manufactured by ANTER Corp.
<Experimental Procedures>
Step 1. By using graphene precursors having a different Rate (3R) as shown in Table 8, a dispersion is obtained under the dispersion condition 2.
Step 2. The dispersion obtained in Step 1 and a resin are placed in a pressing-type kneader and kneaded with a mixture ratio described above.
Step 3. A kneaded mixture obtained in Step 2 was formed into a test piece according to ASTM D257 by an injection molding machine and changes in volume resistance values were observed.
Step 4. A kneaded mixture obtained in Step 2 was formed into a test piece according to ASTM E1530 by an injection molding machine, and changes in thermal conductivity were observed by a regular method.

TABLE 8

| | Mixture ratio (wt %) | | | | | | | |
|---|---|---|---|---|---|---|---|---|
| | | | Graphene precursor | | | | | |
| | LLDPE | AB | Rate (3R) = 23% (Sample 1) | Rate (3R) = 31% (Sample 2) | Rate (3R) = 35% (Sample 21) | Rate (3R) = 42% (Sample 4) | Volume resistance (Ω cm) | Thermal conductivity (W/mK) |
| Example 9-1 | 89 | 10 | — | 1 | — | — | $8.9 \times 10^6$ | 5.2 |
| Example 9-2 | 89 | 10 | — | — | 1 | — | $5.5 \times 10^6$ | 5.7 |
| Example 9-3 | 89 | 10 | — | — | — | 1 | $3.4 \times 10^6$ | 6.8 |
| Comparative example 9-1 | 89 | 10 | 1 | — | — | — | $3.0 \times 10^{10}$ | 1.2 |
| Comparative example 9-2 | 90 | 10 | — | — | — | — | $2.7 \times 10^{10}$ | 1.1 |
| Comparative example 9-3 | 99 | — | — | 1 | — | — | $7.8 \times 10^{17}$ | 0.4 |
| Comparative example 9-4 | 100 | — | — | — | — | — | $5.4 \times 10^{18}$ | 0.32 |

From Table 8, Examples 9-1, 9-2, and 9-3, all have low volume resistance and are excellent in electrical conductivity.

Further it was observed that thermal conductivity was significantly higher in Examples 9-1, 9-2, and 9-3 than in Comparative examples 9-1, 9-2, 9-3, and 9-4.

When the graphene-like graphite exfoliated from the graphene precursors having the Rate (3R) of 31% or more (Examples 9-1, 9-2, and 9-3) was used together with AB, it was confirmed that volume resistance and thermal conductivity were improved. Especially, from Table 8, it was confirmed that the volume resistance and the thermal conductivity showed a tendency to improve sharply after the Rate (3R) reached 31%. It is considered that this is due to the following reasons: according to the same principle as in Example 6, AB having a cross sectional diameter of several hundreds of rum to several μm exists between high molecules of LLDPE. It is speculated that the graphene-like graphite is dispersed each between LLDPE and AB, AB and AB, and LLDPE and LLDPE. Since the graphene-like graphite is in a planar shape and flexible as compared with other materials such as LLDPE and AB, it is considered that LLDPE and AB are brought into a close contact with each other via the graphene-like graphite, thus the volume resistance and the thermal conductivity are improved. In contrast, when the Rate (3R) is less than 31% (Comparative example 9-1), it is considered that an amount of the graphene-like graphite that is dispersed is too small so that an effect of dispersing the graphene-like graphite is not sufficiently exerted.

As the Rate (3R) increases to 35% (Example 9-2) and 42% (Example 9-3), the volume resistance and the thermal conductivity are improved as compared with a case of the Rate (3R) being equal to or lower than that. This is because, it is considered that, as compared with a case of the Rate (3R) being 31% (Example 9-1), the number and a contact area of the graphene-like graphite, which brings LLDPE and AB into a contact with each other, are increased.

It should be noted that, in the dispersion obtained in Step 1, materials exfoliated from the graphene precursors are dispersed. As described above, a part or whole of the graphene precursors is exfoliated to produce a mixed material, containing material from the graphene precursors to the graphene, which is referred to as "graphene-like graphite".

The graphene-like graphite dispersed in the dispersion is not illustrated, however, they can be observed by a transmission electron microscope (TEM) in the same manner as the graphene shown in FIG. 10.

Figure 26:
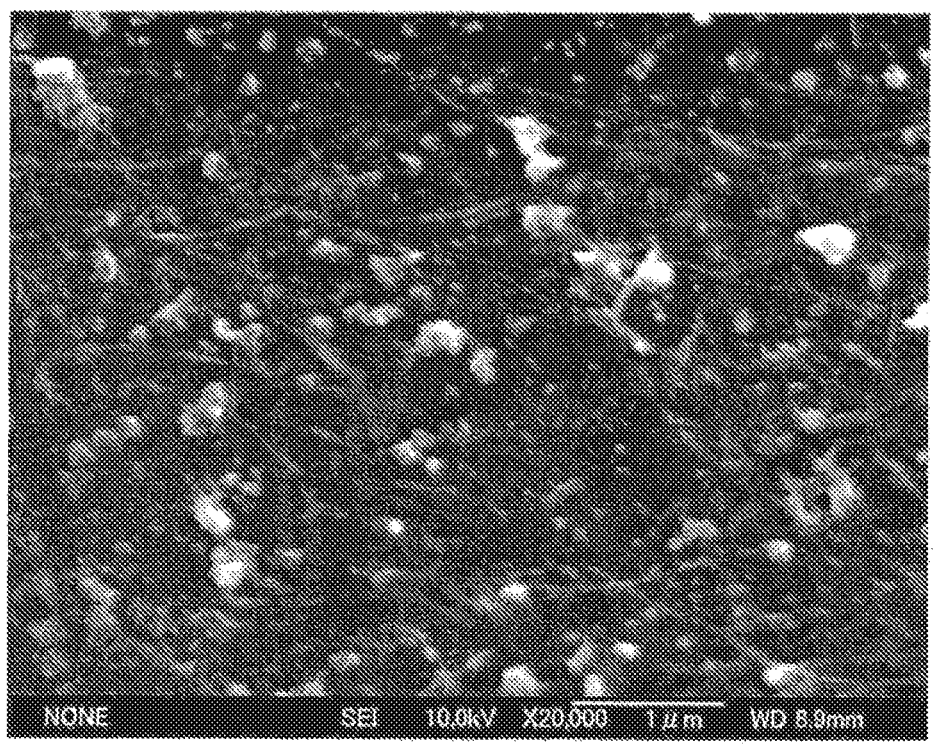
FIG. 26 is a SEM photographed image (cross-section view) of a resin in which graphene-like graphite is dispersed.
Figure 27:
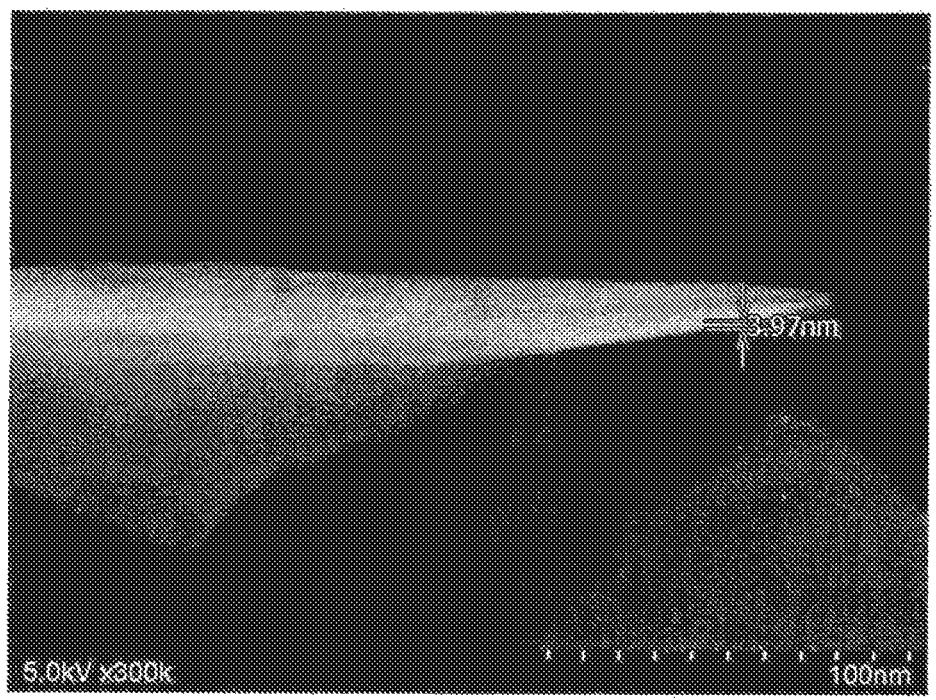
FIG. 27 is a SEM photographed image (side view) of the graphene-like graphite in FIG. 26.

Further, the graphene-like graphite dispersed in a resin can be observed by a scanning electron microscope (SEM) and the like after being formed into a test piece and cut by a precision high-speed saw (TechCut5 manufactured by Allied High Tech Products, Inc.) and the like. For example, FIG. 26 shows a cross section of a resin in which carbon nanotubes and graphene-like graphite are dispersed, where the carbon nanotubes are represented by linear parts and the graphene-like graphite is represented by white spotted parts. This graphene-like graphite is a laminate of flaky graphite having a thickness of 3.97 nm as shown for example in FIG. 27.

EXAMPLE 10

Next, experiments were performed to obtain a resin molded article using the graphene precursors produced in the above methods.

The experiments were performed with a mixture ratio of the graphene precursors having the Rate (3R) of 31% to conductive materials under conditions shown in Table 9.
<Various Conditions>
<<Materials>>
Resin: LLDPE (polyethylene: 20201J manufactured by Prime Polymer Co., Ltd.),
Compatibilizer: KAYBRID 006PP (maleic anhydride-modified PP manufactured by Kayaku Akzo Corp.), Acetylene black (HS-100 manufactured by Denki Kagaku Kogyo Kabushiki Kaisha, average particle diameter of 48 nm, bulk density of 0.15 g/ml, ash content of 0.01%),
<Two-Shaft Extruder>
Two-shaft extruder; HYPERKTX 30 manufactured by Kobe Steel, Ltd.,
Kneading temperature: 135° C.
Screw rotation speed: 100 r/min,
<<Volume Resistance Value>>
Test piece: ø100 mm×t3 mm (ASTM D257),
Measuring device: Device body (R-503 manufactured by Kawaguchi Electric Works Co., Ltd), electrode device (P-616 manufactured by Kawaguchi Electric Works Co., Ltd), Applied voltage: 500 V,
Electric current is measured 1 min after applying voltage.
<<Thermal Conductivity>>
Test piece: ø50 mm×t3 mm (ASTM E1530),
Measuring device: UNITHERM 2021 manufactured by ANTER Corp.
<Experimental Procedures>

Step 1. Graphene precursors having a different Rate (3R) as shown in Table 9 and a compatibilizer are kneaded by a two-shaft extruder to obtain a mixture 1 containing 40 wt % of graphene-like graphite. It should be noted that graphene precursors become graphene-like graphite during the process of kneading.

Step 2. In the same two-shaft extruder, the mixture 1 obtained in Step 1, a resin, and AB are kneaded with a mixture ratio shown in Table 9.

Step 3. A kneaded mixture obtained in Step 2 was formed into a test piece according to ASTM D257 by an injection molding machine and changes in volume resistance values were observed.

Step 4. The kneaded mixture obtained in Step 2 was formed into a test piece according to ASTM E1530 by an injection molding machine and changes in the thermal conductivity were observed by a regular method.

It should be noted that the volume resistance and the thermal conductivity caused by the compatibilizer are not significantly different from those of the resin serving as a base material, thus they shall not be considered in the present embodiments.

TABLE 9

| | Mixture ratio(wt %) | | | Volume resistance ($\Omega$cm) | Thermal conductivity (W/mK) |
| --- | --- | --- | --- | --- | --- |
| | LLDPE (compatibilizer) | AB | Graphene precursor Rate (3R) = 31% (Sample 2) | | |
| Example 10-1 | 89 (1.5) | 10 | 1 | $9.5 \times 10^6$ | 5.3 |
| Example 10-2 | 87 (4.5) | 10 | 3 | $1.5 \times 10^6$ | 5.9 |
| Example 10-3 | 85 (7.5) | 10 | 5 | $4.2 \times 10^5$ | 6.2 |
| Example 10-4 | 82 (12) | 10 | 8 | $1.5 \times 10^5$ | 6.8 |
| Example 10-5 | 80 (15) | 10 | 10 | $9.8 \times 10^4$ | 7.0 |
| Example 10-6 | 75 (22.5) | 10 | 15 | $9.2 \times 10^4$ | 7.1 |
| Example 10-7 | 89.5 (0.75) | 10 | 0.5 | $8.9 \times 10^7$ | 3.1 |
| Comparative example 10-8 | 89.7 (0.45) | 10 | 0.3 | $5.6 \times 10^9$ | 2.0 |
| Comparative example 10-9 | 89.9 (0.15) | 10 | 0.1 | $2.5 \times 10^{10}$ | 1.3 |
| Comparative example 9-2 | 90 (0) | 10 | — | $2.7 \times 10^{10}$ | 1.1 |
| Comparative example 9-4 | 100 (0) | — | — | $5.4 \times 10^{18}$ | 0.32 |
| Comparative example 10-10 | 100 (25) | — | — | $5.5 \times 10^{18}$ | 0.31 |

As shown in Table 9, when the mixture ratio of the graphene precursors to the conductive materials was greater than 1 (Example 10-5), it was observed that the volume resistance and the thermal conductivity stayed at mostly the same values and their characteristics became saturated. Further, when the mixture ratio of the graphene precursors is 10 or more, an impact on properties of base materials becomes significant, an the other hand, when the mixture ratio was less than 1/50 (Comparative example 10-9), it was observed that the volume resistance and the thermal conductivity were mostly the same as a case where the graphene precursors were not mixed (Comparative example 9-2). Based on these, a lower limit of the mixture ratio is 1/50 or more, preferably 1/10 or more, and an upper limit thereof is 10 or less, preferably 1 or less.

EXAMPLE 11

Next, experiments were performed to obtain a resin molded article using the graphene precursors produced in the above methods.

In Example 11, a conductive material used for mixing with the graphene precursors having the Rate (3R) of 31% was changed and an effect caused by a shape of the conductive material was confirmed. The rest is the same as in Example 9.

Figure 28A:
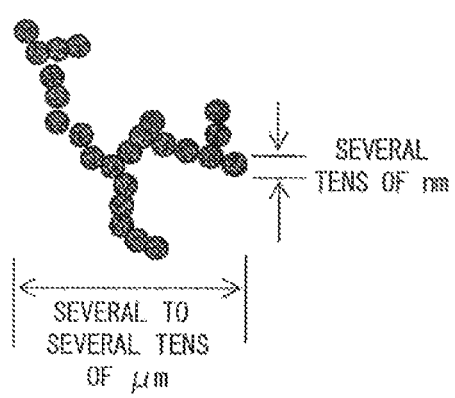
FIG. 28 is a schematic view which illustrates a shape of conductive materials in Example 11, where (*a*) illustrates a shape of acetylene black, (*b*) illustrates a shape of a carbon fiber, and (*c*) illustrates a shape of a metallic particle.
Figure 28B:
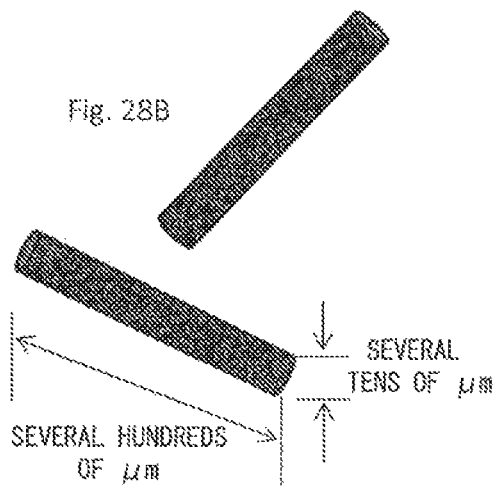
Figure 28C:
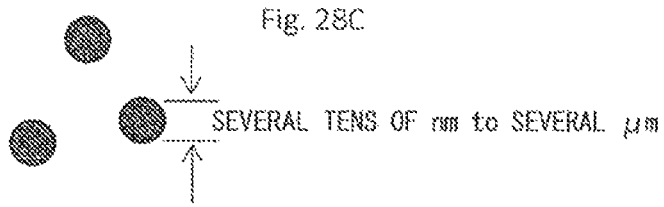

As shown in FIG. 28, acetylene black (AB), a type of carbon black, serving as a conductive material, is a string-like or a straight chain-like shape, having a diameter of several tens of nm and a length of several to several tens of μm. Carbon fibers (CF) have a linear shape having a diameter of several tens of μm and a length of several hundreds of μm. Metallic particles have a diameter of several tens of nm to several μm.

TABLE 10

| | Mixture ratio (wt %) | | | | Volume resistance ($\Omega$ cm) | Thermal conductivity (W/mK) |
|---|---|---|---|---|---|---|
| | LLDPE | AB | CF | Metallic nanoparticle | Graphene precursor Rate (3R) = 31% (Sample 2) | | |
| Example 9-1 | 89 | 10 | — | — | 1 | $8.9 \times 10^6$ | 5.2 |
| Example 11-1 | 89 | — | 10 | — | 1 | $4.5 \times 10^4$ | 7.5 |
| Example 11-2 | 89 | — | — | 10 | 1 | $7.5 \times 10^{15}$ | 0.85 |
| Comparative example 9-2 | 90 | 10 | — | — | — | $2.7 \times 10^{10}$ | 1.1 |
| Comparative example 11-1 | 90 | — | 10 | — | — | $5.2 \times 10^8$ | 2.2 |
| Comparative example 11-2 | 90 | — | — | 10 | — | $4.8 \times 10^{16}$ | 0.41 |
| Comparative example 9-4 | 100 | — | — | — | — | $5.4 \times 10^{18}$ | 0.32 |

As shown in Table 10, both Example 9-1 where AB was added and Example 11-1 where CF was added were excellent in the volume resistance and the thermal conductivity. In contrast, Example 11-2 where metallic particles were added did not show excellent volume resistance or thermal conductivity although the graphene precursors were added and the graphene-like graphite was dispersed. Based on these, it was found that a graphene precursor was preferably used together with a conductive material having a string-like, a straight chain-like, or a linear shape. Further, although not shown in examples, a conductive material having a flake-like shape was also excellent in the volume resistance and the thermal conductivity. Since a nano conductive material in a string-like, a straight chain-like, a linear, or a flake-like shape has a wide surface area per unit mass because of its shape, it is speculated that it is brought into a contact with many pieces of graphene-like graphite, thus having high compatibility with the graphene-like graphite. It was also revealed that, as a conductive material in a string-like, a straight chain-like, a linear, or a flake-like shape, having an aspect ratio of 5 or more is particularly preferable. It is noted that an aspect ratio of a material having a branched structure such as acetylene black may be obtained by calculating a ratio of an average diameter to a length of the longest part. Further, an aspect ratio of a material in a flake-like shape may be obtained by calculating a ratio of an average thickness to a length of the longest part.

EXAMPLE 12

Next, experiments were performed to obtain a resin molded article using the graphene precursors produced in the above methods. In Example 12, the experiments were performed using a graphene paste produced from graphene precursors under the dispersion condition 3.

<Various Conditions>
<Materials>
Diacetone alcohol: Manufactured by Wako Pure Chemical Industries,
Methylparaben: Manufactured by Wako Pure Chemical Industries,
Stabilizer; Nitrocellulose DLX-30-50 (Nobel NC Co. Ltd),
Acetylene black (HS-100 manufactured by Denki Kagaku Kogyo Kabushiki Kaisha, average particle diameter of 48 nm, bulk density of 0.15 g/ml, ash content of 0.01%),
<Mixing>
Mixer (ARE-310 manufactured by THINKY),
<Mixing condition 3>: Normal temperature of 25° C., mixing at 2,000 rpm×10 min, defoaming after mixing at 2,100 rpm×30 sec)
<Coating Condition 1>
Bar coater: No. 16 manufactured by Dai-Ichi Rika Co., Ltd.,
Coating film thickness: 36.6 μm (25.4 μm after drying),
Drying condition: 130° C.×30 min,
Substrate: quartz glass (t2 mm),
Coating area: 50 mm×50 mm,
<Sheet Resistance Measuring Instrument>
LorestaGP MCP-T610 type manufactured by Mitsubishi Chemical Analytech Co., Ltd.,
Measuring condition: JIS K7194
<Experimental Procedures>
Step 1. Graphene precursors having a different Rate (3R) as shown in Table 11 are added to diacetone alcohol (4-hydroxy-4-methyl-2-pentanone), and the mixture is processed with the aforementioned device shown in FIG. 8 operated under the same driving condition to obtain a dispersion having 10 wt % of graphene-like graphite. (the dispersion condition 3)
Step 2. The graphene dispersion obtained in Step 1, methylparaben (methyl 4-hydroxybenzoate), a stabilizer, and AB are added at a ratio shown in Table 11 and mixed under the mixing condition 3 to obtain a mixture 3.

Step 3. The mixture 3 is coated using a bar coater under the coating condition 1 and sheet resistance is measured according to JIS K7194 by a four probe method.

TABLE 11

| | Mixture ratio (wt %) | | | | | | | |
|---|---|---|---|---|---|---|---|---|
| | | | | | Graphene presursor | | | |
| | Di-acetone alcohol | Methyl paraben | Stabilizer | AB | Rate (3R) = 23% (Sample 1) | Rate (3R) = 31% (Sample 2) | Rate (3R) = 35% (Sample 21) | Rate (3R) = 42% (Sample 4) | Sheet resistance ($\Omega$/sq) |
| Example 12-1 | 25 | 20 | 15 | 30 | — | 10 | | — | 22 |
| Example 12-2 | 25 | 20 | 15 | 30 | | | 10 | | 15 |
| Example 12-3 | 25 | 20 | 15 | 30 | — | — | | 10 | 8 |
| Comparative example 12-1 | 25 | 20 | 15 | 30 | 10 | — | | — | 54 |
| Comparative example 12-2 | 25 | 20 | 15 | 40 | — | — | | — | 56 |

As shown in Table 11, it was observed that Examples 12-1, 12-2, and 12-3 had lower sheet resistance than Comparative examples 12-1 and 12-2. It was also observed that Comparative example 12-1 having the Rate (3R) of 23% had substantially the same sheet resistance as Comparative example 12-2 where the graphene precursors were not added. Based on these, it is speculated that, in Examples 12-1, 12-2, and 12-3, the graphene-like graphite together with AB significantly contribute to lowering the sheet resistance. Further it was found that the graphene paste prepared by using the graphene precursors having the Rate (3R) of 31% or more (Examples 12-1, 12-2, and 12-3) sharply reduced the sheet resistance as compared with the graphene paste prepared by using the one having the Rate (3R) of 23% (Comparative example 12-1).

It should be noted that, in the present embodiments, only basic materials were used for constitution in order to exclude disturbance factors. In a conductive ink and paste for practical use, an antioxidant, a viscosity modifier, and a plurality of conductive materials are normally added for providing a desired ink and lowering a resistance value.

The foregoing explained the embodiments of the present invention using drawings, however it should be understood that the specific constitutions are not at all restricted to these embodiments, and changes and additions are also included in the present invention without departing from the gist of the present invent ion.

In the aforementioned embodiments, the production apparatus A using a jet mill and plasma and the production apparatus B using a ball mill and microwaves are described as a production apparatus which produces a graphene precursor. When a treatment based on a radiowave force such as by microwaves, millimeter waves, plasma, electromagnetic induction heating (IH), and magnetic fields, and a treatment based on a physical force such as by a ball mill, a jet mill, centrifugal force, and supercriticality are combined for use, a precursor having a high Rate (R3) can be obtained. Therefore, such combination of the treatments is preferable. Additionally, as long as the radiowave force-based treatments and the physical force-based treatments are used in combination, there is no restriction on a specific kind of the radiowave force-based treatments or the physical force-based treatments to be applied. In particular, as exemplified in the production apparatuses A and B, it is preferable that effects based on the radiowave force and the physical force are simultaneously exerted. However, the radiowave force and the physical force may be alternately exerted at predetermined intervals. Moreover, as for the radiowave force, different radiowave forces, such as treatments based on microwaves and plasma, may be alternately exerted, and, in parallel with the treatments, one or more treatments based on the physical forces may be exerted. Conversely, as for the physical force, different physical forces, such as treatments based on a jet mill and supercriticality, may be alternately exerted, and, in parallel with the treatments, one or more treatments based on the radiowave forces may be exerted.

As examples of base materials for dispersing conductive materials and graphite-based carbon materials, the following materials can be mentioned. It is noted that a ratio of base materials may be smaller than that of conductive materials or graphite-based carbon materials. Further, base materials may be annihilated by combustion, oxidation, vaporization, evaporation, and the like when in use. For example, base materials will be annihilated from a conductive paste, a conductive ink, etc., where the base materials are volatile solvents and the like. Base materials may additionally include a conductive material.

Examples of positive electrode active materials include layered oxide-based active materials ($LiCoO_2$, $LiNiO_2$, $Li(Ni_xCo_y)O_2$ (wherein x+y=1), $Li(Ni_xCo_yAl_z)O_2$, $Li(Ni_xMn_yCo_z)O_2$, $Li(Ni_xMn_y)O_2$, $Li_2MnO_3$—$Li(Ni_xMn_yCo_z)O_2$ (wherein x+y+z=1), etc.), olivine-based active materials ($LiMPO_4$, $Li_2MPO_4F$, $Li_2MSiO_4$ (wherein each M denotes one or more kinds of metallic elements selected from Ni, Co, Fe, and Mn)), Lithium-rich active materials, spinel type positive electrode active materials ($LiMn_2O_4$), and the like.

Examples of resins include thermoplastic resins such as polyethylene (PE), polypropylene (PP), polystyrene (PS), polyvinyl chloride (PVC), ABS resins (ABS), acrylic resins (PIMA), polyamide/nylon (PA), polyacetal (POM), polycarbonate (PC), polyethylene terephthalate (PET), cyclic polyolefins (COP), polyphenylene sulfide (PPS), polytetrafluoroethylene (PTFE), polysulfone (PSF), polyamide-imide (PAI), thermoplastic polyimide (PI), polyether ether ketone (PEEK), and liquid-crystal polymers (LCP). In addition, among synthetic resins: as thermosetting resins or ultraviolet curing resins, included are epoxy resins (EP), phenolic resins (PF), melamine resins (MF), polyurethanes (PUR), and unsaturated polyester resins (UP) and the like; as conductive polymers, included are PEDOT, polythiophene, polyacetylene, polyaniline, polypyrrole, and the like; as fibers, included are fibrous nylon, polyesters, acryl, vinylon, polyolefin, polyurethane, rayon and the like; as elastomers, included are isoprene rubbers (IP), butadiene rubbers (BR), styrene/butadiene rubbers (SBR), chloroprene rubbers (CR), nitrile rubbers (NBR), polyisobutylene rubbers/butyl rubbers (IIR), ethylene propylene rubbers (EPM/EPDM), chlorosulfonated polyethylene (CSM), acrylic rubbers (ACM), epichlorohydrin rubbers (CO/ECO), and the like; as thermosetting resin-based elastomers, included are some urethane rubbers (U), silicone rubbers (Q), fluorine-containing rubbers (FKM), and the like; and, as thermoplastic elastomers, included are elastomers based on styrene, olefin, polyvinyl chloride, urethane, and amide.

Moreover, as mineral oils, included are lubricating oils, and greases, and, as compounded oils for rubbers, included are paraffin-based mineral oils, naphthenic mineral oil, aromatic mineral oils, and the like.

Furthermore, as nonpolar products, included are hexane, benzene, toluene, chloroform, ethyl acetate, and the like, as polar aprotic products, included are acetone, N,N-dimethylformamide (DMF), N-methylpyrrolidone (NMP), acetonitrile, and the like, and, as polar protic products, included are acetic acid, ethanol, methanol, water, 1-butanol, 2-propanol, formic acid, and the like.

As conductive materials, the followings can be mentioned. As metallic materials, included are silver nanoparticles, copper nanoparticles, silver nanowires, copper nanowires, flaky silver, flaky copper, iron powders, zinc oxide, and the like. As carbon materials, included are carbon black, carbon fibers, CNT, graphite, activated carbon, and the like. As conductive polymers, included are PEDOT, polythiophene, polyacetylene, polyaniline, polypyrrole, and the like. In particular, fibrous materials in a chain-like, string-like, and flake-like shape are excellent in conductivity.

Further, as an example of natural graphite for producing a graphite-based carbon material useful as a graphene precursor, a natural graphite material in a particulate shape having a size of 5 mm or less (flaky graphite ACB-50 manufactured by Nippon Graphite Industries, Ltd.) is described above. As for natural graphite, a preferable product is flaky graphite that is pulverized into 5 mm or less, having a Rate (3R) of less than 25% and an intensity ratio P1/P2 of less than 0.01, from a perspective of being easily procured. Corresponding to recent technology development, natural graphite-like graphite (in which crystals are stacked in layers) can be artificially synthesized, thus raw materials for graphene and graphene-like graphite are not limited to natural graphite (mineral). Artificial graphite having a high degree of purity is preferably used for a purpose of controlling a metal content such as in a battery.

It should be noted that a graphite-based carbon material useful as a graphene precursor is generally referred to as graphene, a graphene precursor, a graphene nanoplatelet (GNP), few-layer graphene (FLG), nanographene, and the like, however it is not particularly limited thereto.

INDUSTRIAL APPLICABILITY

The present invention covers a composite conductive material having conductivity, and an application field thereof is not limited. It should be noted that, in the present invention, conductivity refers to at least one of electrical conductivity, ion conductivity, and thermal conductivity. The following fields are included as examples.
(1) Examples of Electrical Conductors (Conductors)
(1-1) Power Storage Device
(1-1-1) Battery Included are electrical conductive materials used for a positive electrode material, a negative electrode material and the like for a battery, in particular a lithium-ion battery, the electrical conductive materials being preferably excellent in both electrical conductivity and ion conductivity. As a material constituting a battery, the following materials are exemplified, however, it is not limited thereto.

Positive electrode active material: $LiCoO_2$, $LiMn_2O_4$, $LiNiO_2$, $LiFeO_4$, $Li_2FePO_4F$, $Li(Co_x, Ni_y, Mn_z)O_2$
Conductive assistant: graphite powders, acetylene black, VGCF, CNT
Negative electrode material: graphite powders, hard carbon, activated carbon, titanate ($Li_4Ti_5O_{12}$), Si
Electrolyte solution: PC (polycarbonate), EC (ethylene carbonate), DEC (diethyl carbonate)
Supporting electrolyte: $LiPF_6$, $LiBF_4$, LiTFSI
Collecting conductor: aluminum foil, copper foil, lithium foil (1-1-2) Capacitor and Condenser Included are capacitors and condensers, such as a lithium-ion capacitor, an electric double-layered capacitor, and a condenser, preferably excellent in electrical conductivity. As a material constituting capacitors and condensers, the following materials are exemplified, however, it is not limited thereto.

Collecting electrode: aluminum foil
Polarizable electrode: activated carbon
Conductive assistant: carbon black, CNT
Electrolyte; tetraethylammonium ion, tetrafluoroborate ion, bis(trifluoromethylsulfonyl)imide
Electrolyte solution: propylene carbonate, ethylene carbonate, diethyl carbonate, dimethyl carbonate (1-2) Conductive Dispersion Included are conductive dispersions, such as a conductive ink, a conductive paste, a conductive slurry, and the like, used for conductive devices that include a transparent/non-transparent conductive film and an electronic circuit substrate (printing and photo-etching), the conductive dispersions being preferably excellent in electrical conductivity. As a material constituting conductive dispersions, the following materials are exemplified, however, it is not limited thereto.

Solvent: water, drying preventing agents (glycerin, glycols, etc.), penetrants (alcohols, glycol ethers, etc.), alcohols, NMP (N-methylpyrrolidone), DMF, toluene, ethyl acetoacetate, ketones
Colorant: dyes, pigments
Resin: thermoplastics resins such as acrylic block copolymers, acryl, maleic acid, rosin, epoxy, silicones, butyral, and the like
Additive: pH regulators, chelating agents, surfactants, antibacterial and antifungal agents, antioxidants, ultraviolet absorbing agents, plasticizers
Conductive material: graphite powders, carbon black (Ketjen black, acetylene black, etc.), carbon fibers, CNT (SWNT and MWNT), metal fine powders (copper/silver nanoparticles), metal oxides (ITO and zinc oxide), metal fibers (copper/silver nanowires), conductive polymers (PEDOT, polyacetylene, etc.)

(1-3) Conductive Composite

Included are conductive composites such as for use in preventing conductivity, static electricity, and electrification, and intercepting electromagnetic waves, the conductive composites being preferably excel lent in electrical conductivity. As a material constituting conductive composites, the following materials are exemplified, however, it is not limited thereto.

Electrical conductive material: Fe and Ni as metal. Carbon fibers, isotropic graphite, and carbon black as carbon materials.

Polymer: PE, PP, PS, PC, PVC, ABS, PA6, PA66, PSS, PEEK, POM, epoxy, natural rubbers, chloroprene rubbers, NBR, silicone rubbers.

(2) Examples of Thermal Conductivity (2-1) Thermally Conductive Composite (2-1-1) Heat Sinks for Thermal Conductive Films, Thermal Conductive Polymers, Etc.

Included are heat sinks capable of improving heat resistance time of a mixture by releasing local heat, preferably excellent in thermal conductivity. As a material constituting heat sinks, the following materials are exemplified, however, it is not limited thereto.

Conductive material: Cu, Al, and W as metal. Carbon fibers and isotropic graphite as carbon materials.

Polymer: PE, PP, PS, PC, PVC, ABS, PA6, PA66, PSS, PEEK, POM, epoxy, natural rubbers, chloroprene rubbers, NBR, silicone rubbers.

(2-1-2) Heat Radiation Grease and Paste

Included are a heat radiation grease and paste serving as a material for connecting between a heat radiation object and a heat sink as exemplified in (2-1-1), preferably excellent in thermal conductivity. As a material constituting a heat radiation grease and paste, the following materials are exemplified, however, it is not limited thereto.

Solvent: silicone grease (polysiloxane compounds)

Conducting agents: zinc oxide, silver nanoparticles, nanodiamond, carbon black, silicon nanoparticles

REFERENCE SIGNS LIST

51 An aluminum foil
52 A positive electrode active material (base material)
53 AB (conductive material)
54 Graphene-like

The invention claimed is:

1. A method of producing a composite conductive material, comprising a step of kneading at least a graphite-based carbon material and a conductive material into a base material, the graphite-based carbon material having, just before the kneading step, a rhombohedral graphite layer (3R) and a hexagonal graphite layer (2H), wherein a Rate (3R) of the rhombohedral graphite layer (3R) and the hexagonal graphite layer (2H), based on an X-ray diffraction method, which is defined by following Equation 1 is 31% or more:

$$\text{Rate }(3R)=P3/(P3+P4)\times 100 \quad \text{Equation 1}$$

wherein
  P3 is a peak intensity of a (101) plane of the rhombohedral graphite layer (3R) based on the X-ray diffraction method,
  P4 is a peak intensity of a (101) plane of the hexagonal graphite layer (2H) based on the X-ray diffraction method; and
  implementation of the kneading step produces at least graphene exfoliated from the graphite-based carbon material, the graphene being a crystal of a mean size of 100 nm or more and formed in a flake-like or sheet-like shape having 10 layers or less.

2. The method of producing the composite conductive material according to claim 1, wherein the conductive material is a microparticle in a string-like, straight chain-like, linear, or flake-like shape.

3. The method of producing the composite conductive material according to claim 2, wherein the microparticle has an aspect ratio of 5 or more.

4. The method of producing the composite conductive material according to claim 1, wherein a weight ratio of the graphite-based carbon material to the conductive material is 1/50 or more and less than 10/1.

5. The method of producing the composite conductive material according to claim 2, wherein a weight ratio of the graphite-based carbon material to the conductive material is 1/50 or more and less than 10/1.

* * * * *